United States Patent

[11] 3,532,132

[72] Inventor David Rubenstein
San Diego, California
[21] Appl. No. 695,045
[22] Filed Jan. 2, 1968
Continuation-in-part of Ser. No. 522,336,
Oct. 25, 1965, now Patent No. 3,380,259,
which is a continuation-in-part of Ser. No.
391,987, Aug. 25, 1964, now Patent No.
3,250,654, which is a continuation-in-part
of Ser. No. 392,075, Aug. 19, 1964, now
abandoned, which is a continuation-in-part
of Ser. No. 702,050, Dec. 11, 1957, now
Patent No. 3,177,902, which is a continuation-in-part of Ser. No. 743,464, June 20,
1958, now Patent No. 3,111,569, which is
a continuation-in-part of Ser. No. 345,084,
March 27, 1953, now abandoned, which is
a continuation-in-part of Ser. No. 229,852,
June 4, 1951, now Patent No. 2,850,890.
[45] Patented Oct. 6, 1970
[73] Assignee Chem-Stress Industries, Inc.,
a corporation of California

[54] APPARATUS FOR THE MANUFACTURE OF
REINFORCED COMPOSITE CONCRETE PIPE-
LINES
44 Claims, 42 Drawing Figs.

[52] U.S. Cl. .................................................... 138/172,
138/141, 138/153
[51] Int. Cl. ........................................................ F16l 9/04,
F16l 9/08
[50] Field of Search .............................................. 138/172,
174, 173, 175, 176, 178, 177, 141, 140, 144, 146,
149, 153; 156/172, 189, 190, 191, 425, 430—433,
794, 428; 61/72.2; 25/32; 161/(Rubenstein Digest);
138/(Glass Digest)

[56] References Cited
UNITED STATES PATENTS

| | | | |
|---|---|---|---|
| 1,636,367 | 7/1927 | Illemann.................. | 138/146 |
| 2,605,202 | 7/1952 | Reynolds................. | 61/72.1 |
| 2,614,058 | 10/1952 | Francis................... | 138/141X |
| 2,945,638 | 7/1960 | Crawford et al........... | 138/141X |
| 2,962,052 | 11/1960 | Sergouie.................. | 138/145 |
| 2,991,808 | 7/1961 | Siegmann et al.......... | 138/141 |
| 3,175,586 | 3/1965 | Jatsch..................... | 138/144X |
| 3,297,056 | 1/1967 | McLaughlin et al....... | 138/145 |
| 3,301,278 | 1/1967 | Lander et al............. | 138/145 |
| 3,338,271 | 8/1967 | Plumner et al........... | 138/174 |
| 3,381,718 | 5/1968 | Darrow................... | 138/141 |
| 3,396,641 | 8/1968 | Welty et al.............. | 138/141X |
| 3,399,094 | 8/1968 | Skoggard et al.......... | 156/172X |

Primary Examiner—Laverne D. Geiger
Assistant Examiner—Henry K. Artis

ABSTRACT: This patent application relates to cast-in-place composite reinforced structural material pipe-lines for laying in a trench wherein said pipe-lines during processing extend from a mandrel or a means of forming and making into a suitable environment exampled by a trench on-site. Said pipe-lines comprise structural materials comprising polymeric-resin-composition-fiber-reinforced, and in some embodiments, metal reinforced, combined with structural materials exampled by aggregate particle fillers. Pipe-liners of the invention comprise (1), pipe-liner materials provided on-site by at least partially processed pipe-liner materials disposed on reel-units and and further processed on-site, and (2), pipe-liners formed on the site by means exampled by mandrel means and the apparatus used in conjunction therewith. The pipe-liners of the invention may act as a forming means for further processing or may be disposed into said suitable environment such as a trench from said making means. Said pipe-line constructions are adapted to use in corrosive environments, high pressure lines, chemical pipe-lines, water lines, sewer lines, gas lines, and oil lines.

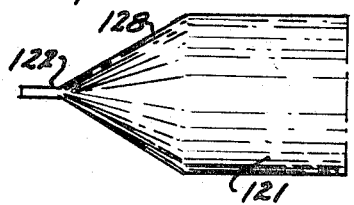
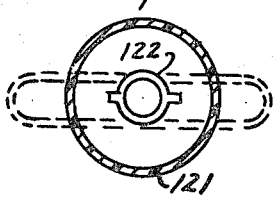
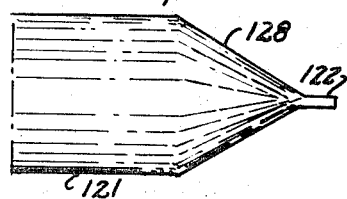
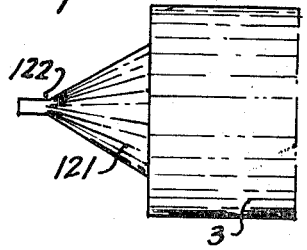
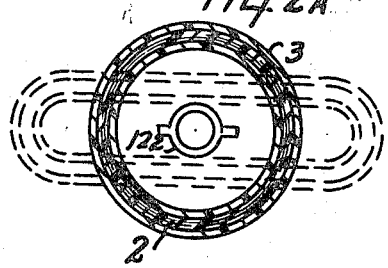
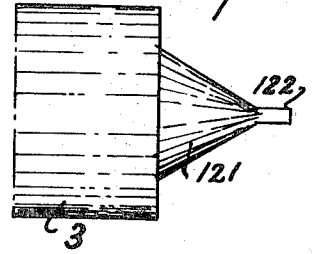
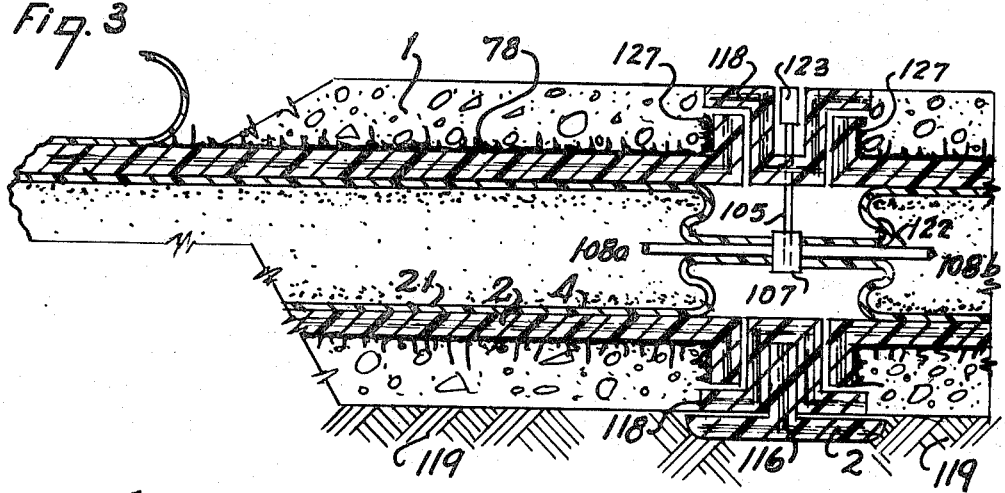
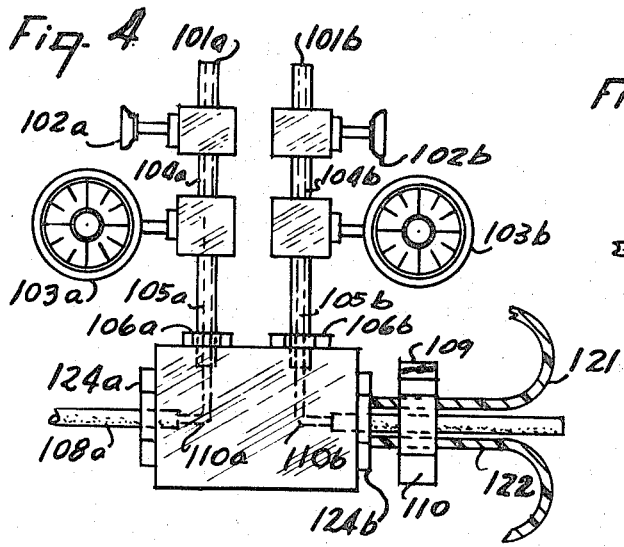
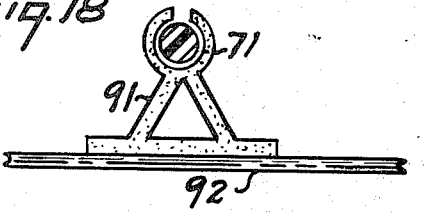
INVENTOR.
BY David Rubenstein

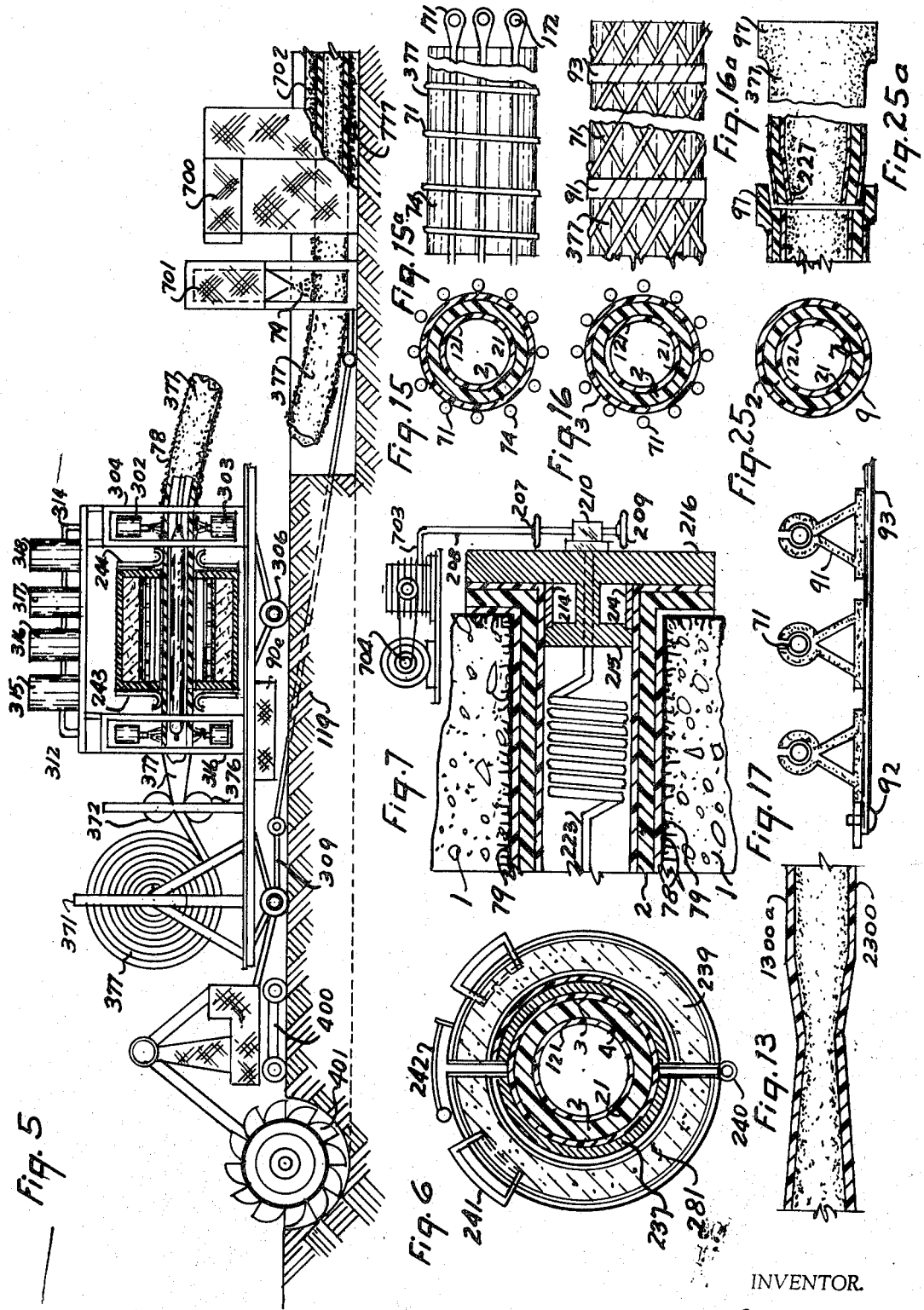

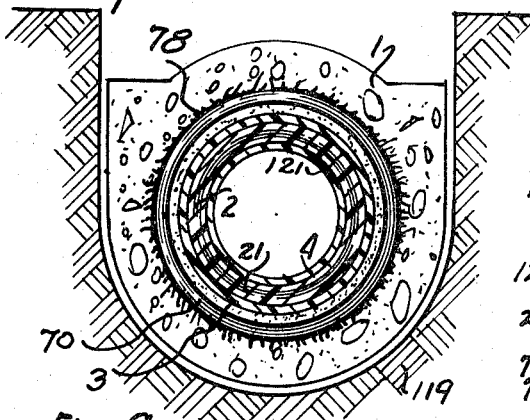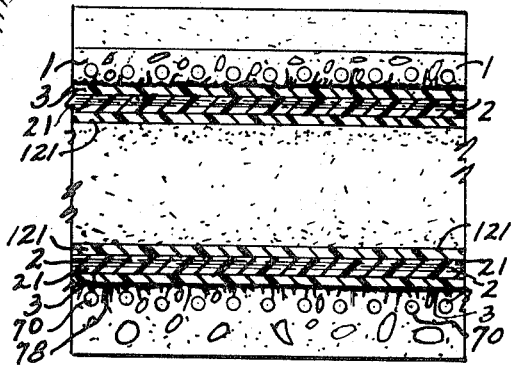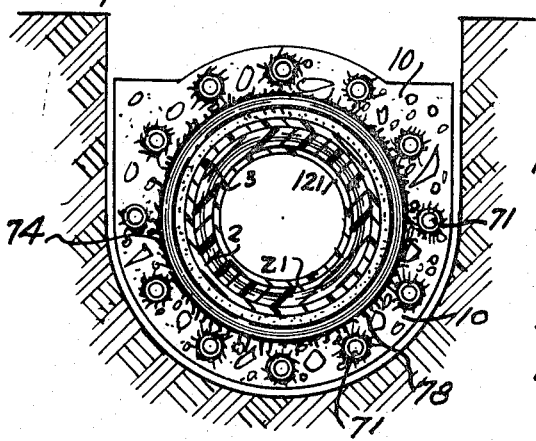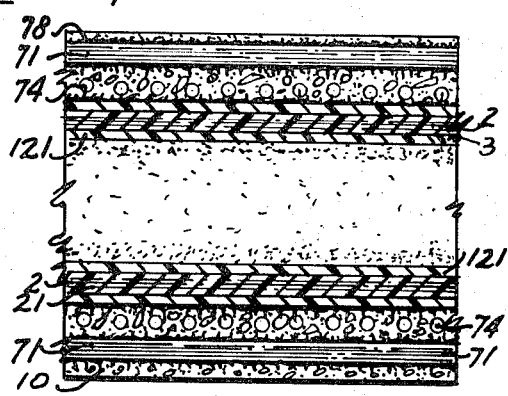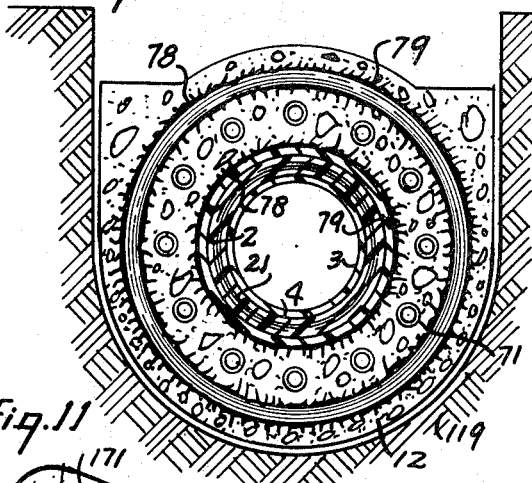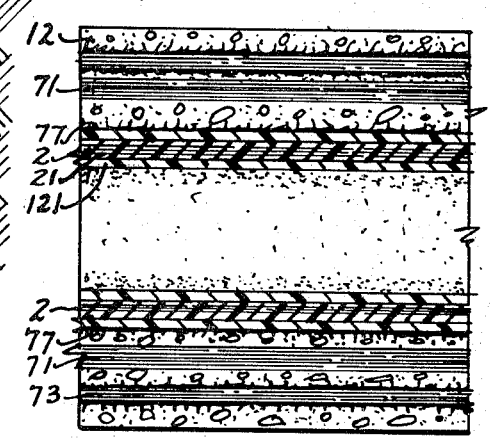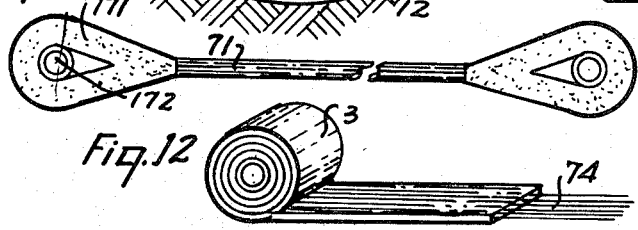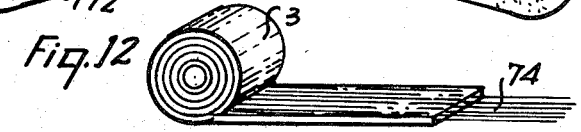

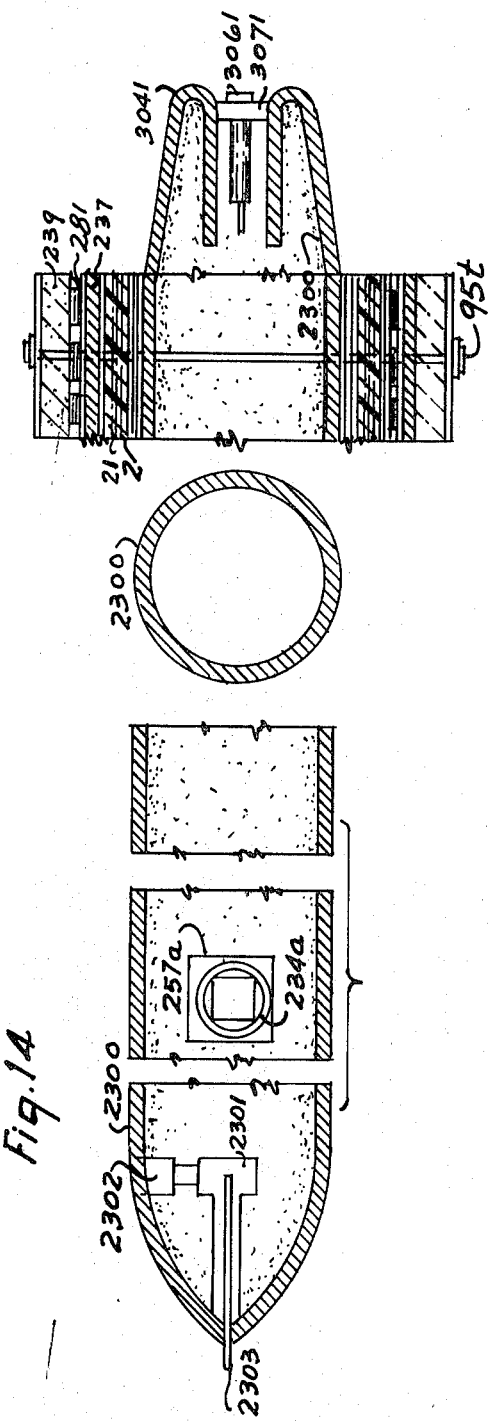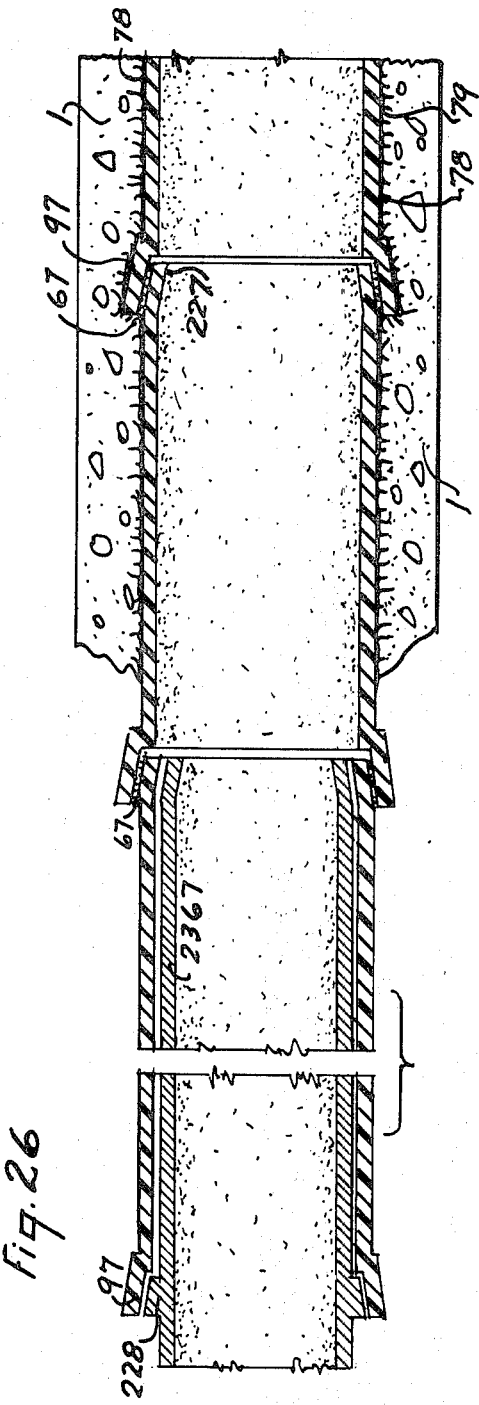

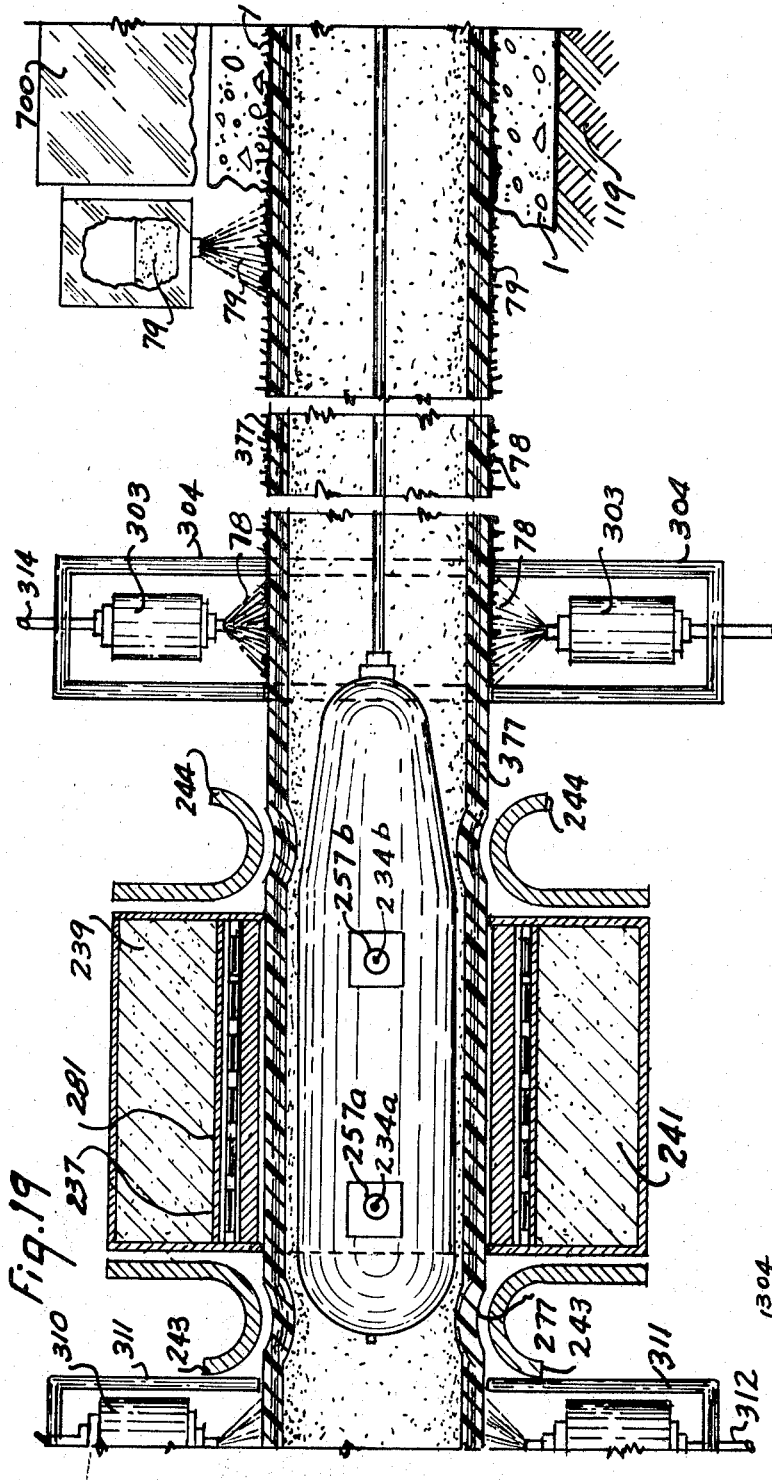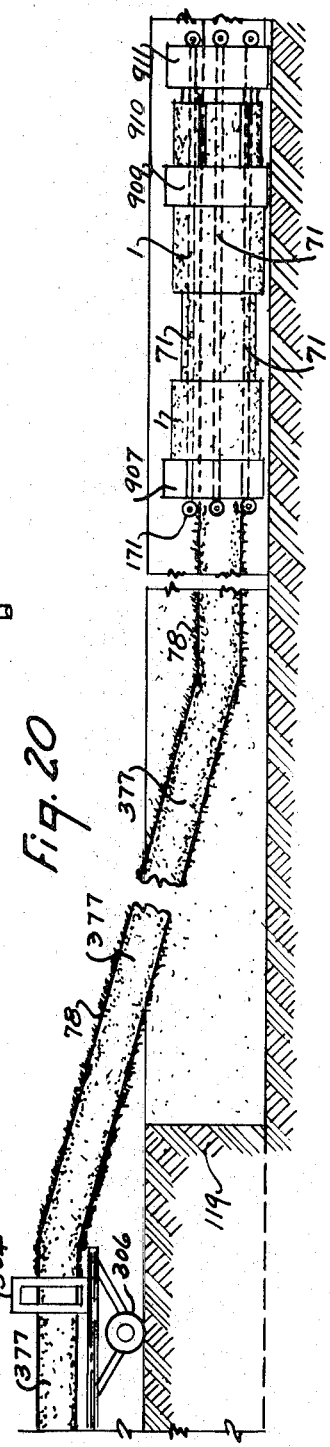

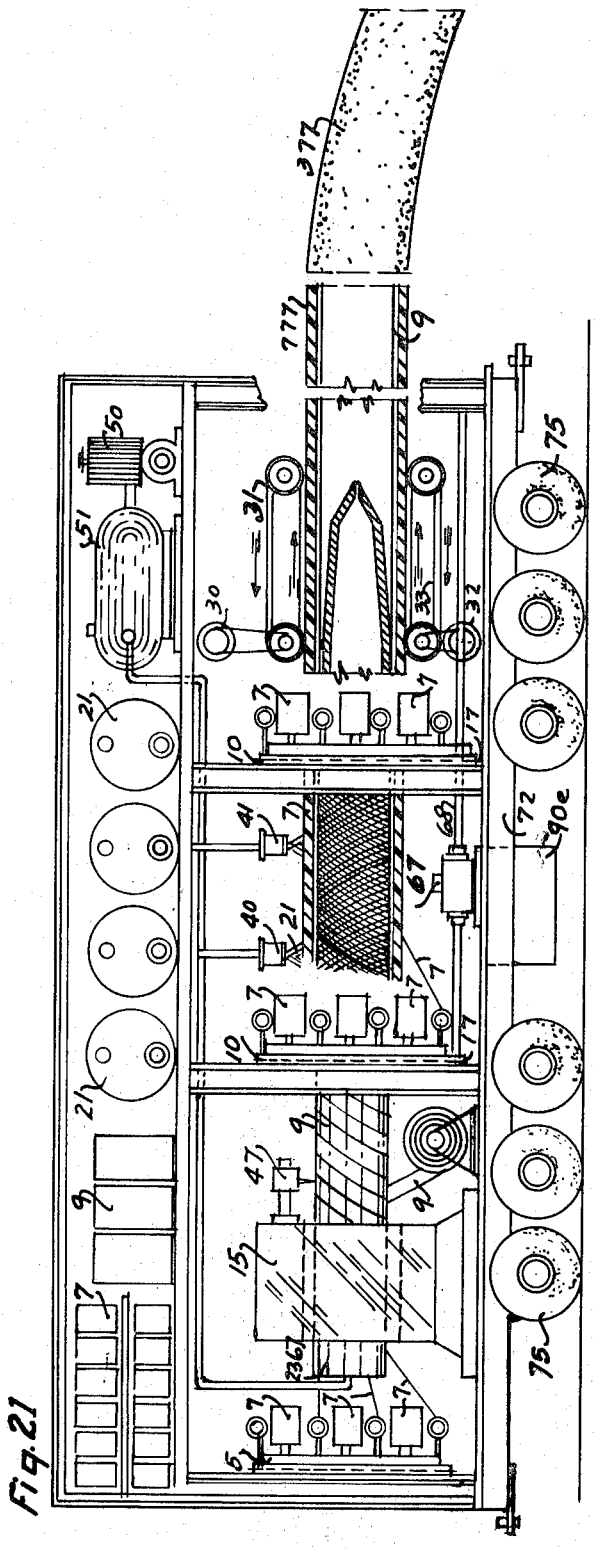
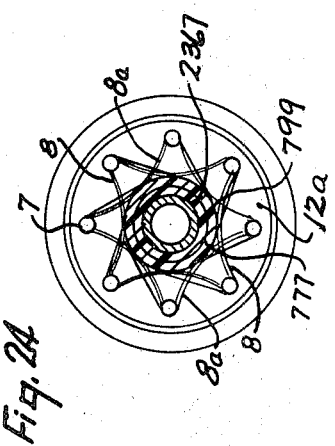
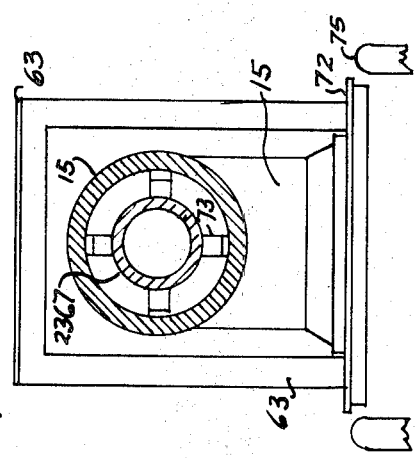
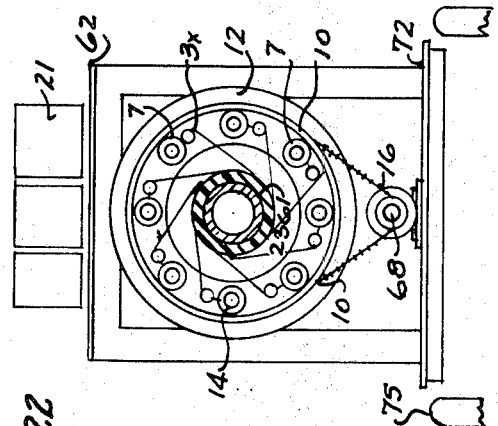
INVENTOR.
BY David Rubenstein

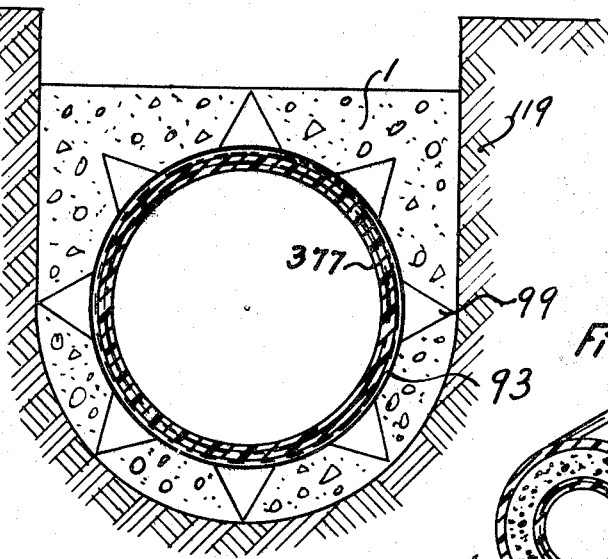
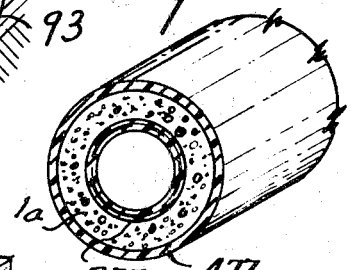
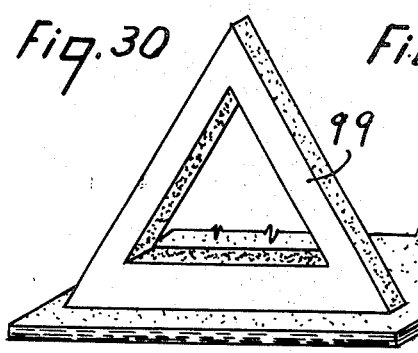
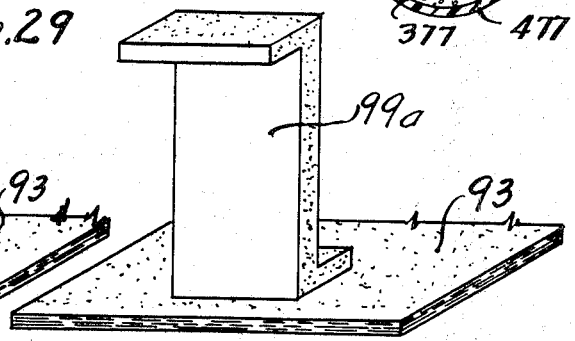
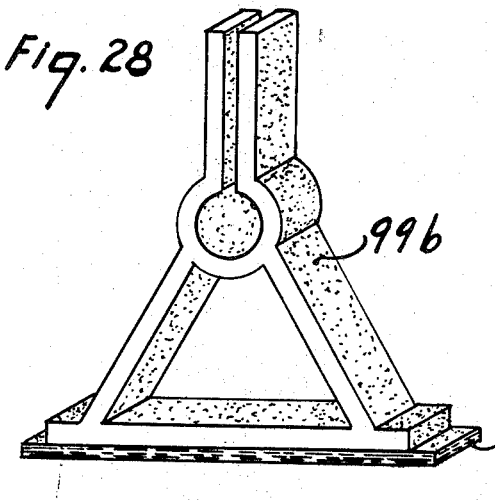
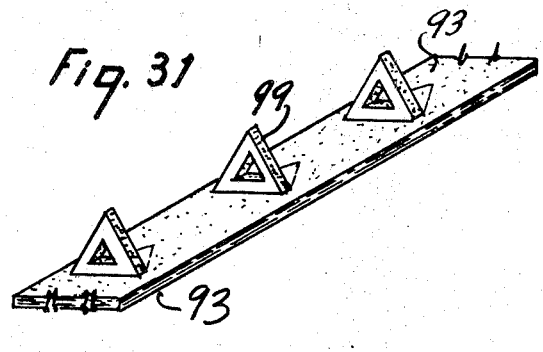
INVENTOR.
BY David Rubenstein

APPARATUS FOR THE MANUFACTURE OF REINFORCED COMPOSITE CONCRETE PIPE-LINES

This patent application is a continuation-in-part to my prior copending application Ser. No. 522,336, filed Oct. 25, 1965, now U.S. Pat. No. 3,380,259, and which application is a continuation-in-part application of my then copending application Ser. No. 391,987, filed Aug. 25, 1964, and now U.S. Pat. No. 3,250,654; and my then copending application Ser. No. 392,075, filed Aug. 19, 1964, now abandoned, said application being a continuation-in-part to my then copending application Ser. No. 702,050, filed Dec. 11, 1957, and now U.S. Pat. No. 3,177,902; and my then copending application Ser. No. 743,464, filed June 20, 1958, now U.S. Pat. No. 3,111,569, both said applications filed as continuation-in-part applications to my then copending application Ser. No. 345,084, filed Mar. 27, 1953, now abandoned as to the specification but not as to the inventions disclosed therein; and which application Ser. No. 345,084, filed Mar. 27, 1953, is a continuation-in-part application to my then copending patent application Ser. No. 229,852, filed June 4, 1951, and now U.S. Pat. No. 2,850,890.

This application for patent relates to composite structural material pipe lines useful as articles comprising cast-in-place water systems, irrigation water systems, sewer systems or the like, and includes special constructions useful in oil, gas, and chemical pipe-line systems.

Cast-in-place concrete pipe-lines have been provided in the past by casting concrete in place in a trench. No reinforcement was used and in some places these cast-in-place pipe-lines have failed because the normally low tensile strength of concrete did not resist loads imposed on said pipe-lines. These pipe-lines were made by apparatus exampled by U.S. Pat. Nos. 2,696,576, 2,731,698, 3,032,852, 3,049,787, and 3,106,760.

An object of this invention is to reduce substantially the cost of water systems, irrigation systems, sewer systems, oil, gas, and chemical pipe systems.

Another object of this invention is to make high pressure prestressed preloaded reinforced concrete engineered constructions onsite as prestressed concrete pipe, prestressed concrete pile constructions, deep well pipe and casing, and pipe-liner constructions for existing pipelines.

Another object of this invention is to provide composite concrete pipe-lines and prestressed preloaded high pressure composite concrete pipe-lines wherein the reinforcements means comprises polymerizable polymeric resin composition means and non-metallic reinforcing means used alone, and/or non-metallic reinforcing means used in combination with selected metallic reinforcing means, said reinforcing means being used in onsite constructions and being combined with poured-in-place porous structural materials, concrete materials, or other selected poured-in-place materials.

Another object of this invention is to provide low or no-pressure composite concrete pipe-lines having pipe-liner construction which provides a very smooth interior surface to the construction which surface improves flowability through such a pipe-line on the order of 25 percent increased flow, more or less.

By definition herein, the word "concrete" is broadly defined as such material being "porous structural material" and includes any "porous structural material" capable of and of being used in various embodiments of this invention. Such structural material includes concrete aggregate particle fillers and fibers and metallic embodiments.

The structural material utilized in this invention can be made out of any masonry or concrete material, or aggregates therefor, in the form of a member of the group consisting of Portland Cement concrete, lightweight Portland Cement concrete, perlite concrete material, vermiculite concrete material, fire-expanded shale aggregate concrete material, fire-expanded clay aggregate concrete material, volcanic cinder concrete aggregate material, processed cinder aggregate material, river run crushed rock aggregate concrete material, pit-excavated crushed rock aggregate material, silica sand, washed aggregate sands, river sand, beach sand, and in fact any natural stone or manmade stone-like products having the required engineering materials strengths in any specific structural design of the invention can be used. Each raw material or concrete material in terms of the broad definitions herein is used in a balanced designed structural engineering manner adapted to its own particular features in use. Concrete utilizing polymerizable polymeric resin compositions as the bonding material may be used wherein all Portland Cement is omitted from the mixture, and/or portions of the Portland Cement being provided mixed with noncementitious cements, e.g., polymerizable polymeric resinous thermoplastic and/or thermosetting materials may be used. Compatible combinations of thermoplastic and thermosetting materials may be used for their structural properties and for coreactive properties in specifications of specific formulations as binders in providing concrete pipe-line material components of this invention.

The composite structure pipe construction comprises the sandwiching and laminating as well as the chemical and mechanical dispersion of cements, aggregates and materials to integrate and laminate and compose into structure the various materials used. By using materials having structural, chemical, resistance and other characteristics having specific type functions and in specific type embodiments of this invention uses normal to the said materials or modified uses of the said materials, provide useful embodiments of this invention. By methods utilizing casting, membering, joining, assembling and incorporation by lamination, component parts, pieces, units, fabrics, binders, fillers, glass fiber rovings, glass fiber strands, glass fiber woven roving, unidirectional glass fiber roving mats, glass fiber mats, glass fiber cloth, extenders, natural fibers, synthetic fibers, sisal fibers, steel wire, either woven or plain, deformed or smooth reinforcements, copper wire, metal reinforcements of any kind or type, wire cables, rods, perforated metal, hemp, rope, nylon, rubber, butyl rubber, plastics, plasters, wood fibers, wood pieces, bamboo, burlap, asbestos fillers, asbestos fibers, crushed rocks, sand, silica particles, minerals, Portland Cements, natural cements, and any other materials whose final end use properties, and functional characteristics, add to, comprise, make, constitute, cast, laminate or incorporate added strength in tension, compression, shear and torsion, provide new and novel composite structure pipe improvements. In particular, materials useful to resistance to abrasion, e.g., minerals of the order of 4 to 10 on Moh's scale are useful materials. Clay in several of its chemical compositions, e.g., bentonite clays are useful materials. Lead in sheet, strip, particles and powder form comprises a useful material in certain specific embodiments of the invention.

The constructions of this invention are directed to "Water-Saving" features in the construction of irrigation pipe-line systems, potable water supply systems, gas, oil and chemical pipe-line systems, and the like. Quantities of water are lost in the present water supply systems because of leakage caused by cracks in the body of the pipe or because of permeation through the walls of the pipe, e.g., as much as thirty (30) percent of transported water is lost in transmission. Corrosion destroys miles of gas, oil and chemical pipe lines.

The manufacture of unreinforced concrete pipe lines in the existing art has inherent problems due to the nature of conventional concrete because of the shrinkage of concrete in its setting, its low tensile strength, being about 10 percent of its compression strength. Shrinkage causes cracks and cracks cause leaks and loss of water or other fluids flowing through such pipe. Additionally, earth loads, expansion pressures of soils having expansive characteristics, like adobe soils, poor supporting sub-grades, "slugging the line", i.e., admitting large quantities of water to a pipe-line so as to cause high internal pressures by the water or water and air combined, sonic booms, create internal stress systems adverse to the integrity of the pipe-line.

Thus an object of this invention is to provide improved structure for cast-in-place concrete and porous structural material pipe-lines while at the same time taking full advantage of the cost savings features the art of the cast-in-place systems offer.

These and other objects will be apparent from the drawings and the following descriptions thereof. Referring to the drawings, which are for illustrative purposes of the embodiments of this invention:

FIG. 1 is a partial elevation of an inflatable pipe-liner embodiment of this invention;

FIG. 1a is a cross section of FIG. 1 of this invention;

FIG. 1b is a partial elevation of said inflatable embodiment of this invention;

FIG. 2 is a partial elevation of another kind of an inflatable pipe-liner embodiment of this invention;

FIG. 2a is a cross section of FIG. 2 of this invention;

FIG. 2b is a partial elevation of this invention;

FIG. 3 is a longitudinal partial section of an embodiment of this invention showing means of joining two ends of two pipe-liners together;

FIG. 4 is an elevation of valved connecting device of this invention;

FIG. 5 is a vertical elevation of a continuous concrete pipe-line laying apparatus train of this invention;

FIG. 6 is an enlarged cross section of a portion of FIG. 5;

FIG. 7 is a partial longitudinal cross section of a portion of the apparatus of this invention;

FIG. 8 is a cross section and FIG. 8a is a partial longitudinal section of an embodiment of this invention;

FIG. 9 is another cross section and FIG. 9a is a partial longitudinal section of an embodiment of this invention;

FIG. 10 is another cross section and FIG. 10a is a partial longitudinal cross section of an embodiment of this invention;

FIG. 11 is a partial elevation of a nonmetallic fibrous reinforcing cable adapted for use in making prestressed preloaded constructions of this invention;

FIG. 12 is an isometric view of a roll of ready-for-use prepared nonmetallic reinforcment used in this invention;

FIG. 13 is a longitudinal section of a venturi embodiment of this invention;

FIG. 14 is a cross section and FIG. 14a is a partial longitudinal section of another mandrel torpedo-like inflating device of this invention;

FIG. 15 is a cross section and FIG. 15a is a partial elevation of a prestressed embodiment of this invention;

FIG. 16 is another cross section and FIG. 16a is a partial elevation of a prestressed preloaded embodiment of this invention;

FIG. 17 is a partial elevation of a reinforcement holding strap;

FIG. 18 is an elevation of an enlarged view of reinforcing cable chair;

FIG. 19 is an enlarged view of pipe-liner forming apparatus of this invention;

FIG. 20 is an enlarged view of a pipe-liner placement and of prestressed preloaded construction adapted to a portion of said pipe-liner;

FIG. 21 is a diagrammatic view of another type of apparatus used in providing onsite or near onsite manufacture of pipe-liners of this invention;

FIG. 22 is a diagrammatic view of elevation of spinning apparatus of this invention;

FIG. 23 is a sectional elevation of a mandrel torpedo-type holding means and a mandrel in section of this invention;

FIG. 24 is a cross section of a finished product of this invention;

FIG. 25 is a cross section and FIG. 25a is a partial longitudinal section of a finished portion of an embodiment of this invention wherein the pipe-liner is made to a preselected length and has a bell and spigot end construction;

FIG. 26 is a longitudinal cross section of the mandrel and pipe-liner made thereon wherein the pipe-liner has bell and spigot ends;

FIG. 27 shows an alternate means comprising an element made of a belt-form and a plurality of wall thickness guides of the invention;

FIG. 28 shows another embodiment of wall thickness and expansion guides having a dual purpose of providing reinforcing means holders and wall thickness guides;

FIG. 29 shows another embodiment of wall thickness guides;

FIG. 30 shows another embodiment of yet another wall thickness guide;

FIG. 31 shows another embodiment of wall thickness guides; and

FIG. 32 shows an isometric view of a two component construction having an inner pipe-liner and an outer cover construction with a concrete or formed resin filler therebetween.

In the prior art the method of making cast-in-place concrete irrigation and the like pipe-lines are exampled by the use of long length tubular inflatable forms of flexible material such as reinforced rubber closed end tubes, which tubes are placed in a predug trench just ahead of a continuous concrete pipe material placing machine. This tube is extended into said machine, or said machine advances over said tube. The tube is inflated to a required amount, e.g., 3 lbs. to 10 lbs. of air pressure, which pressure makes said tubes rigid enough to support the load of wet poured concrete as a flowable mix supplied through the placing machine. The placing machine is fed a flowable concrete mixture from a field provided source of mixing the same or by truck mixers supplying said concrete pipe making machine in sequence as needed as the pipe machine is pulled over said inflated tube. The outside of the tube is covered with release powder so that when the concrete pipe-line is set and cured, the inflated tube can be deflated and withdrawn from the finished pipe.

Also in the art connected short lengths of metal tubes, e.g., aluminum tubes are utilized as removable forms and are layed in a predug trench. When the machine has completed sections of concrete pipe-line in said trench, the metal sections are removed. The cost of placing such forms is considerable and not only involves the use of the forms themselves, but involves smoothing and surfacing areas of the finished pipe to overcome ridges or irregularities caused by misalignment or bent sections of the metallic forms resulting in uneven surfaces in the finished pipe.

In my U.S. Pat. Nos. 2,671,158, 2,951,006, 3,111,569, and in other of my applications and patents pending I disclose and claim embodiments of pipe-line structure wherein I provide particular packaged-ready-for-use tubular pipe-liners comprised of fiber reinforced constructions embedded in polymerizable polymeric resin compositions. These embodiments are provided on reel-units or in packaged assembly. The particular embodiments are thus provided in various types and kinds of end structure made as an end use product. There are different methods of making the same composite structures provided in these patents and in the instant invention. The method of making partially cured ready-for-use pipe-liner constructions shown in my U.S. Pat. No. 3,250,654 is considered as a part of this application for providing pipe-liners in this invention. This improvement of making pipe-liners onsite following the digging of a trench or providing other earth environment is a cost reducing method. When direct placement of the pipe-liners is impractical because of onsite conditions, the apparatus is placed near by and obviates long hauls of pipe-liner constructions. The pipe-liners are then provided in suitable length sections and may be made with integral bell and spigot ends so that by slipping a bell end over a spigot end a continuous pipe can be made. Certain existing apparatus can be used as in the present state of the art, i.e., in combination with the means of this invention. Existing means of metal forms are used without inflation and are temporarily braced.

Pipe-line structures having diameters of from 6 inches in diameter to 20 feet in diameter are provided by this invention, but not limited thereto, the major uses being in the range of 12 inches to 72 inches in diameter.

In the practice of this invention, a trenching machine or other means or having a tractor pulling means or other driving means for pulling ahead is provided to first dig a trench of required size and shape. Alternately a boat or motorized scow places the machine and apparatus in an earth's environment to practice the invention, e.g., from ocean located oil rig to shore facilities by connecting the same with pipe-line of the invention.

Following the pipe-liner trailer or other apparatus is found the concrete placing machine which is supplied from an in-place mixing plant or by truck type mixing machines. The trenching machine, the pipe-liner trailer, and the concrete placing machine or other means are all connected together by cables and are moved forward by the tractor of the trenching machine. Alternatively, each machine or apparatus may be self-propelled and operated in sequence obtained in the same way when all machines are connected together. Onsite features and conditions will dictate conditions of manufacture of the complete pipe-line operations.

The instant invention is an integrated pipe-line structure onsite by supplying or providing or making onsite provided a pipe-liner component which first acts as a forming means for the pipe construction whereby a flowable mix of concrete, or resin-crete concrete or elastomer-crete concrete is placed around, about, under and over the said pipe-liner construction, and second remains in place as originally placed as a reinforcement of the composite concrete and fibrous reinforced polymeric resin composition comprising said pipe-liner. The pipe-line structure is a reinforced composite concrete pipe. The component parts of the materials of construction are used in sequence, or provided in sequence, and remain in placed position as placed. No wasted labor or material occurs in the method of manufacture. The concrete placing machine or other means finishes the exposed surface of the poured structural materials of the pipe-line.

The extraordinary high strength reinforcements provided and the improvements in the body structure of the concrete component of the composites and structure of the invention made by improving the tensile strength of the concrete material by incorporating polymerizable polymeric resin compositions in accordance with a structural design of the product in the manner of the invention, provides very substantial improvements in product and very substantial reductions in cost. Irrigation pipe-lines and high pressure pipe-lines are improved and have increased features of functionality as well as improved pipe structure. Substantially complete impermeable pipe walls are achieved. Leakage from inside out or from outside in is stopped. The high smoothness feature of the pipe-liner 377 increase flow properties materially in the pipe-line.

Referring now to the FIGS. of the drawings of this invention:

FIG. 1, 1a, and 1b shows a cross section and partial elevation of a pipe-liner 377 tubular reinforcing and surfacing construction of this invention. This tubular reinforcing comprises fibrous reinforcement embedded in polymerizable polymeric resin composition provided in packaged condition in ready-for-use state as shown in my U.S. Pat. No. 2,951,006, and may have features of other of my invented constructions as shown in my U.S. Pat. Nos. 3,111,569, 3,177,902 and 3,340,115. Additionally, it may be supplied as a product made by the method of my U.S. Pat. No. 3,250,654.

In FIG. 1 element 121 represents an inflatable envelope type of pipe-liner 377 with element 122 illustrating the feed tube for inflation of the construction. Element 128 represents the tapered portion of the end of the tubular reinforcing and surfacing means and is sized at the angle of between 30° and 45° as related to the diameter of the tube which avoids bulging when said tube is inflated. In practice the amount of air pressure required for inflation of pipe-liner 377 for the thinnest type of liner I can make is about 3 lbs. to 10 lbs. air or fluid pressure, but not limited thereto, as other pressures may be used. One example of such a construction comprises glass fiber reinforcing strands embedded and covered with a polymerizable polymeric resin composition, e.g., epoxy resin composition, or e.g., unsaturated polyester resin composition as disclosed in my patents supra, but not limited thereto as e.g., rubbery materials, butyl rubber or elastomeric polymeric resin compositions may be used alone or in combination with other thermoplastic resin compositions and thermosetting resin compositions.

In starting the manufacture of the composite concrete pipe-line structure, an amount of pipe-liner 377 is pulled from the reel-unit through rolls 372 and 376. The end of the pipe-liner 377 has its elements 122 and 128 cut off so that the pipe-liner 377 in its full diameter can be attached to the bulk-head elements 215—216, the mandrel 236 as shown in FIG. 7. Before attaching the pipe-liner 377 to the said bulk-head 215—216, the mandrel 236 and the air hose connected to it are inserted into the open end of the pipe-liner 377. A sufficient amount of pipe-liner 377 is processed through the oven and over the mandrel to make it a set and cured polymeric resin composition fiber reinforced pipe-liner 377 construction.

Alternatively, the pipe-liner 377 construction is processed in an oven into a partially cured construction so that additional elements and components of specific constructions can be incorporated into the pipe-liner or concrete and pipe-liner 377 construction after it leaves the oven by integrated bonding processes. In either case the pipe-liner 377 is sufficiently strong to be used as shown and will hold air or fluid pressure if the same is needed to support the load of the covering material or concrete 1.

The bulk-head 215—216 has connections for the air hose or fluid means 233 which is further connected to the air compressor or fluid means outside the bulk-head. The tubular pipe-liner 377 can be connected to additional lengths of the same by several means. Element 127 represents one such means wherein the pipe-liner 377 has its end bent backward to form a right angle as shown in FIG. 7, with the flange of the bulk-head 216 serving as support for element 127. Two such ends are connected one to the other as shown in FIG. 3 wherein is shown an expansion joint having elements 118 and 127, and as shown in the lower part of FIG. 3 wherein is shown elements 2, 116, 118, and 127.

There are further means exampled herein but not limited thereto and provided in this invention wherein a tubular pipe-liner 377 is connected to another pipe-liner 377 by means of tubes 122 formed as a part of the two ready-for-use constructions. When a length of pipe-liner 377 is placed in final place of use the concrete 1, or elastomeric-resin concrete or resin-crete concrete is placed around, about, over and under said pipe-liner 377. As shown in FIG. 19, the exterior surface of the pipe-liner may have a layer of polymerizable polymeric resin composition or other type layer applied to said surface after the formed pipe-liner 377 leaves the oven. This material may be highly adhesive so that in a portion of the apparatus just before the pipe-liner 377 enters into the concrete placing machine, sand or sand and Portland Cement, or any other bonding medium may be placed over and onto the pipe-liner 377. In the combination of the pipe-liner 377 and the concrete 1 "fingers" of polymeric resin composition or composite material "fingers" are provided by the rough surface made or by the nature of the materials having capability to penetrate and permeate the concrete 1 forming secure anchorages in the said concrete structure thereby. Additionally, composite structured material unitary in combination is provided in the combination of the polymerizable polymeric resin composition and the fibrous reinforcements and the concrete material. Comingling at the interface to selected depths of composite construction is a significant feature of this invention. The exterior application of highly adhesive materials is not limited to the interface area because in certain embodiments of this invention the adhesive materials can penetrate and permeate clear through the concrete body. Additionally, when I use resin-crete or elastomer-crete concrete the resulting composite construction including the pipe-liner 377 is a unitary bonded construction. When the construction is placed in an earths' environment such as a dug ditch, the earth itself comprising the side walls and bottom of the ditch which is in its natural state is a part of the total composite structure because the concrete bonds to the said earth materials. Load transfer is much better between the concrete pipe made in place and problems encountered in settling of back-fill do not occur.

By design and intended uses, the pipe-liner 377 can be provided having different capabilities to resist internal pressures and external pressures by reason of the kind of and amount of fibrous or metal materials used, or polymerizable polymeric resin compositions used. Particularly, specific features of the invention can be provided by a plurality of polymeric resin compositions compatibly used or functionally used. The construction of pipe-liner 377 and concrete 1 can have features of prestressed preloaded structure as in FIG. 20 which are provided in a structurally engineered manner in combination with the chemically engineered manner of the arts.

Capabilities of structure of the composite pipe-line of this invention can be many. As to pressure capabilities, for irrigation systems internal pressure resistance can be from a nominal 0 to e.g., 50 p.s.i. with minimum thicknesses of pipe-liner 377 used. Internal pressures can go to e.g., 500 p.s.i. internal pressure resistance. In either case impermeability of the composite structure is provided. By varying the rigidity of internal structure of the invention materials, other capabilities can be achieved, e.g., shock resistance against earthquakes and the like, sonic boom, load bearing capabilities over unstable or low value subgrade soils, overburden loads, and articulative properties and resistance provided to overcome poor tensile properties of concrete per se by increasing its tensile capacity loading characteristics. The pipe-liners 377 can be made and are made to have specific properties adapted to resist corrosion as occurring in sewer lines, or from acid soils, or alkalie soils or environments, or salt water, or in fact any other environmental condition which pipe-liners 377 can meet.

In FIG. 4 apparatus is shown comprising dual air supply means comprising entrance nipples 101a and 101b, valves 102a and 102b, gauges 103a and 103b, and connecting nipples 105 and 105a connected to junction box 107 by means of holding nuts 106a and 106b and said nipples, and further, extension nipples and/or pipes 108a and 108b around which tubular extensions 122 of pipe-liner 377 are fastened to said extension nipples 108a and 108b. This dual system with common junction box 107 enables air and/or fluid pressure to be balanced inside of the pipe-liner 377 while concrete 1 is obtaining its set state which can be several hours. By holding internal pressure support substantially equal, concrete 1 can be cured without cracking.

Further, when pipe-liner 377 is prestressed preloaded by said internal pressure, a substantially uniform amount of pressure is desirable and required and is thus provided.

When the concrete 1 and the pipe-liner 377 are united into set and cured composite concrete pipe-line structure, the pipe-line can be entered into and the ends of the pipe-liner 377 shown connected by the joining apparatus as for maintaining substantially equal air pressure are cut off by means of a cutting tool and the expansion joint or other connecting joint shown in FIG. 3 is completed.

Alternatively, the method of my U.S. Pat. No. 3,250,654 can provide pipe-liner 377 in specific lengths, e.g., 4 feet long, 5 feet long, 10 feet long, 20 feet long, or in fact, any desirable lengths to the amount that can be layed in one operational period, e.g., a day, and each length may have a bell-type configuration on one end and a spigot configuration on the other end. Other types of pipe-line joinery can be used as shown in my prior art and as adapted to the instant invention. Bell and spigot joinery is quickly conveniently joined together by use of rubber rings as known in the art or as by the use of polymeric resin compositions. The length of the bell-type end can be e.g., 4 inches, 6 inches or even 12 inches, or in fact any structural dimension required by a design. The bell-type end can be a snug fit assembly that enables quick assembly secured in place by the use of the said polymerizable polymeric resin compositions. The bell-type end can have features involving the use of resilient rubber rings, or Teflon, i.e., polytetrafluoroethylene polymeric resin rings, etc., as known in the art. An epoxy resin composition having a copolymerizable component such as a polyamide resin or a polysulfide resin or a proprietory amine setting agent is available now so that timed and quick setting and curing can be provided for bonding the bell-type end to the spigot type end of a pipe-liner 377.

In the present art of thermoplastic extrusions, products are available that provide thermoplastic resin compositions made into extruded pipe structure. These pipe structures can be used in the manner of thermosetting resin compositions wherein element 9 of my U.S. Pat. No. 3,250,654 is shown as a release film is further processed in this invention to provide a thermoplastic material as the inner surface component of a particular pipe-liner 377, or if of adequate cross section, comprise the pipe-liner 377 construction. Polymeric resin materials such as Lexan, a polycarbonate resin, nylon, linear polyesters, such as Dacron, low density polyethylene, high density polyethylene, polypropylene, polyvinyl chloride, polystyrene, or cellulose acetate can provide polymeric resin materials useful in this invention. These may be used alone in certain embodiments, or may be used in combination or layered constructions of the invention.

The fibrous reinforcements of the invention may be provided in helically wound constructions alone or in combination with circular wound constructions. Glass mats, rovings, or strands may be used; pluralities of layers of the same may be used. Pluralities of glass fiber rovings in ring-like or helically wound rovings can be used to provide cable-effect reinforcements as shown in FIG. 22 as a series of ribs. The pipe-liner 377 having such ribs inherently has adequate mechanical bonding between the pipe-liner 377 and its cover of concrete 1. Such ribs are strengthening material can be placed in or on a pipe-liner construction so as to structurally resist loading and impacts from any direction, the placement being a matter of structural design. Integrated cable-like reinforcements in a prestressed state can thus be made a part of a pipe-liner 377 construction.

FIG. 2, 2a, and 2b represents a cross section and partial elevation of a tubular pipe-liner 377 encased in a structural reinforcing means wherein element 2 comprises glass fiber or other fiber reinforcement embedded in polymerizable polymeric resin composition 21 and is packaged in between layer 3 and layer 121, layer 3 being the exterior cover and layer 121 being the interior cover. Element 125 represents a closure means for element 3 and can be a heat sealed bonded connection or other equivalent means of closure, or element 3 can be a seamless or one piece tube.

FIG. 3 shows an enlarged section taken longitudinally of an embodiment of the invention. Element 1 represents the concrete body of a flowable concrete mix poured about the inflated tubular construction pipe-liner 377. Element 2 comprises fiber reinforcing, e.g., glass fiber roving provided in helical lay and cross lay and having additional glass fiber circularly applied and bonded together by element 21 comprising the polymerizable polymeric resin composition. Element 121 shows the inner layer which can be a component of the pipe-liner or can be a related component applied first as a mold release and left in place to protect the high polish of the inner surface of the pipe-liner structure which is obtained by the smoothness characteristic of the said related component. Element 125 represents a closure means for element 3 and can be a heat sealed or bonded connection as in FIG. 2. In this example, element 3 is shown being removed from the pipe-liner 377 prior to the pouring of the concrete or other porous structural material about pipe-liner 377. Element 78 represents the penetration and permeation of the porous structure of the concrete body component 1 which as disclosed in my patents and copending application supra, provide very substantial reinforcement and prestressed preloading means to the composite pipe structure of this invention. Element 127 represents flanged ends to provide one type of connection between two lengths of pipe-liner 377. Elements 105 again with elements 108a and 108b, 107, and 123 represent component parts of connection and inflating means between two lengths of pipe-liner 377. Element 116 and 118 represent joinery components for permanently or otherwise connecting two lengths of pipe-liner 377 together. Element 119 represents the earth in the bottom and sides of a trench or other place of use upon which the entire pipe construction rests in place of final use. Since the concrete 1 is provided in its flowable unset state, the interface between it and the earth 119 must be considered carefully in design so that full advantage of the properties of all the materials including 119 are utilized. Earth 119 is considered a part of the composite pipe-line structure.

FIG. 4 represents an enlarged diagram of connecting means between two tubular pipe-liners 377 and has been described *supra.*

FIG. 5 is a side elevation and partial section of a complete pipe making and laying train comprising a ditcher represented by element 401 which is driven by a tractor 400, which tractor pulls the pipe-liner providing machine on a trailer by means of cable 309 connected to front wheels 308 of said trailer vehicle containing the apparatus of the invention. Following the pipe-liner 377 providing trailer means is the concrete placing and finishing machine which rides over the pipe-liner 377 and passes the pipe-liner through the machine where it is covered with concrete 1. Just prior to entry of the concrete placing machine the exterior surface of the pipe-liner 377 is covered with bonding material 79 which is placed over the polymeric resin composition adhesive 78 which has been applied to the pipe-liner 377 after it leaves the oven which forms pipe-liner 377. The location of these elements are not critical but elements 78 and 79 are needed when certain types of composite structure pipe is made. When the rib type structure is made as an embodiment of pipe-liner 377, certain constructions will not need 78 and 79.

Element 90e represents a diesel-electric power source for heat and electricity.

Mounted on the vehicle, standard support 371 holds in the reel-unit the tubular pipe-liner 377 in a rolled-up condition. The pipe-liner 377 is fed off from the reel-unit and is passed through rolls 373 and 376, the reel-unit being mounted on axle 375 supported by braces 373. On leaving the rolls 372 and 376, the tubular pipe-liner 377 is inflated by means of air or fluid pressure coming from the mandrel 236 which is mounted in curing chamber 241. As shown in FIG. 19 the spring type pressure elements 243 and 244 exert pressure upon the pipe-liner 377 at points 277 and 278. As shown in FIG. 6, the oven is a circular piece of apparatus and is hinged at 240 and locked together at 242. The pressure exerted by elements 243 and 244 is sufficient to hold the pipe-liner 377 in a fixed position while the polymeric resin compositions of the pipe-liner are cured to a partial state of cure or to a full state of cure depending upon the kind of resin system then in use. In my U.S. Pat. No. 3,250,654 the preferred method of manufacture is to bring at least a portion of the pipe-liner 377 to a partial state of cure so that additional processing carried on in this invention results in a composite structure having an integrated and bonded composition. In certain embodiments, initial layers of a composite pipe-liner 377 structure may be fully cured as in oven in FIGS. 5 and 6. Mandrel 236 may contain heated air or fluid. Additional layer or layers may be partially cured or may be uncured polymerizable polymeric resin composition, rubber, or elastomeric resin composition. The fibers used, e.g., glass fibers are held in place in either layer and are not affected by heat in the curing temperatures of the polymeric resin compositions suited to any of the specific formulated compositions used. Control of heat is by known thermostatic means and time in the oven is concentrated to preselected periods of time. Also certain resin systems may be cured at ambient temperatures.

Alternatively, the polymerizable polymeric resin compositions, fibers, and the fillers if used, can be selected in specific formulation so that a continuous process comprising passing pipe-liner 377 over the mandrel 236 at a specific rate of speed and providing it formed ready-for-use for applying bonding material, e.g., polymerizable polymeric resin composition 78 and later at the entrance to the concrete placing machine applying binding and bonding materials 79 to the surface of the formed pipe-liner 377. The apparatus 236 comprising the mandrel and the apparatus 243 and 244 represent means of mechanically holding the pipe-liner 377 in this processing step. The drawing FIG. 19 exaggerates the depression formed in the pipe-liner 377 by the pressure means which depression is shown at 277 and 278. The mandrel 236 as shown in FIG. 19 has a rounded front end and a tapered rear end. The location of the pressure means 243 and 244 is such that the pipe-liner 377 is engaged under pressure at the round end and the tapered end. Other means of holding the mandrel in position during the curing process are available and disclosed herein.

As shown in FIG. 5, tanks 316, 315, 317 and 318 contain chemical components of the resinous materials of the invention then being used. These materials are shown dispensed by spray means but may be dispensed by any other means known in the art, e.g., dipping the fibers, spreading by doctor blades, laminating painting, mechanical brush systems, electrostatic spray systems, pressure spray systems, or in fact any other means may be employed in the manner of the invention. Element 310 represents the spray device mounted on frame 311 and is fed from tank through hose 312. The torpedo-like mandrel 236 as enclosed in the oven is supported on frame 325 having braces 305. This frame is adjustable so as to allow for horizontal placement of the oven and mandrel and for more or less slope in placement of the oven and mandrel so any desired manufacturing feature can be carried out.

Spray units 303 and 304 cover the outer surface of the tubular pipe-liner 377 after it leaves curing chamber oven 241 so that at element 701 the sprayed material may be covered with bonding materials or minerals such as sand or Portland Cement and sand, or other useful materials to effect bond with the poured concrete as the concrete component is formed over the inflated tubular pipe-liner 377. This bond is shown as being at the interface between the concrete 1 and the tubular pipe-liner 377 at 78 as well as into the concrete 1 effecting a very strong bond therewith, and as at 79.

Element 233 comprises an air feed tube or other fluid feed means whereby the tubular pipe-liner 377 is inflated by means of this embodiment of apparatus. Element 702 show the smoothing means of a known pipe laying machine and element 777 shows the finished top surface of a poured and finished construction.

FIG. 6 shows an enlarged section of the construction of an embodiment of the invention wherein 121 shows the interior laminated layer component retaining fibers 2, e.g., glass fiber strands, embedded in polymeric resin composition 21, e.g., unsaturated polyester resin composition, or epoxy-polyamine resin composition, or a polyvinyl chloride resin composition. These materials may be in combination and enclosed in an envelope 3. Element 3 may be an aluminum or other rigid material capable of holding the tubular element 377 in fixed sized position or it may be cured material or partially cured material depending upon the specific embodiment then being made as the reinforcing and lining components comprising the pipe-liner 377 of the composite pipe construction. Element 237 may have attached thereto heating elements 281 and be encased in element 239 which is an insulating construction for retaining heat or otherwise controlling the curing or partial curing of the polymeric resin compositions of this invention. By the nature of certain polymerizable polymeric resinous substances the cure cycle of these substances can be initiated by catalyst means, or copolymerizable means, or with heat, or with reactive materials, or with rays or with light. Time of curing can be varied as known in the art by the curing agents supplied or by environmental factors provided in any given process. As is known, partial curing can be done in one stage and completed in another, as e.g., epoxy resin compositions or unsaturated polyester resin compositions which are first made as B-stage materials, *i.e.*, partially polymerized, can be completely polymerized at a later stage. The use of setting means or catalysts, or curing means which *e.g.*, operate at elevated temperature enable manufactured components being in the B-stage of cure because heat used in elevated temperature curing can be removed prior to completion of a cure cycle and the cure can be resumed at a later time or other place by providing the amount of heat needed to complete the system cure. Pipe-liner 377 with respect to its fibrous components alone can be supplied on the reel-unit, and as shown in FIG. 5 be covered and impregnated with polymerizable polymeric resin composition just ahead of the oven by apparatus 310.

Alternatively, the fibrous components of pipe-liner 377 can be partially or wholly covered and impregnated with a polymerizable polymeric resin composition and set to a B-stage and when supplied on a reel-unit be inflated and processed through the apparatus of the instant invention.

FIG. 7 shows an enlarged longitudinal section of components of this invention. Forming means 236 comprises a mandrel having a forward port 233 and side ports 234a and 234b, and may have additional apparatus as will be shown later. One use for these features can be the emission of air or fluid from the mandrel to release or inflate the tubular pipe-liner 377. Mandrel 236 is a forming means used in combination with oven 241 and is maintained in position by apparatus of oven 241, or by electronically or electrically controlled or otherwise operated magnetic devices or proximity switches operating ferromagnetic metal sensitive switches, *e.g.*, as procurable from the Honeywell Controls Corporation, Micro Switch Division, of Freeport, Illinois. Specialized elements of these kinds of apparatus are available particularly designed for temperature gradients and spacing of elements of the instant invention. Improved double sheet detector type proximity switch system plus magnetic device holding systems could include two sensor components, an amplifier, a relay and a magnetic holding device. Such a device and system is represented in FIG. 19 by elements 257a and 257b.

The forming means mandrel 236 is connected to feed line 223 which extends through bulk-head 215 which is a part of supporting end bulk-head 216. In this example, air compressor 704 supplies air under pressure through line 703. Entry portion of air or fluid line 703 is shown at 208 and feeds into entry control unit 210 which also has fine control valve 209 so as to substantially maintain a constant pressure in the system.

Construction of the pipe-liner 377 can vary as the needs dictate. The example shown in FIG. 7 shows the pipe-liner 377 under pressure and expanded around the mandrel 236 with a portion shown in the mold 241. In the molding means 241 element 237 comprises an aluminum plate platen curved to the shape of the pipe-liner 377. Other platens may be used of other material. This platen is heated by electrical means wherein strip heaters are spaced around the platen shown as elements 281. Other means of heating may be used, *e.g.*, steam, hot water, hot air, internal temperatures induced by catalysts or curing agents wherein the polymerization reaction provides heat to cure the particular polymeric resin composition, or radiant heat may be used, or sunlight, or in fact any other useful means may be used after the tubular pipe-liner 377 is formed into shape. The degree of cure, whether partially cured or wholly cured, or all or portions of the pipe-liner are cured in either way is a matter of design of manufacture. The apparatus is available and the materials are available to provide either product.

The right-hand portion of FIG. 7 shows a sectional view of the composite pipe-liner and concrete 1 pipe construction after all materials are in place. The bottom of trench 119 is supporting the poured-in-place-concrete 1 which is shown surrounding pipe-liner 377. The resin bonding composition 78 and bonding minerals 79 comprise "finger-like" resinous materials and sand, or sand and Portland Cement, or in fact any other useful binding and bonding materials forms the interface layer. In the case of ribbed or exposed cable reinforcements used to reinforce the composite structure certain embodiments will rely on structural mechanically provided anchorage of the pipe-liner 377 and its reinforcing means to the concrete 1. Also concrete 1, or polymerizable polymeric resin bound concrete *i.e.*, resin-crete or elastomer-crete concrete 1 in certain embodiments have shrinkage and in setting and curing such resins will prestress preload the pipe-liner 377 and the concrete body. Also such polymerizable polymeric resin compositions will have in specific formulations the necessary bond strength to make unitary structure out of the pipe-liner 377 and concrete 1 cover.

Polymerizable polymeric resin composition element 21 is shown embedding fibers 2, *e.g.*, glass fiber unidirectional strands contained in envelope 3. In this embodiment envelope 3 is melted by temperature of the polymerization reaction and comingles with the polymeric resin composition 21. In other embodiments the resin of envelope 3 may be a peel-off type of envelope, or it may be another material used as a protection cover and being removed before final stage of process is done, *e.g.*, kraft paper and aluminum foil. Other types and kinds and features of embodiments will require other envelope materials and functions.

A flange embodiment 127 is shown but the construction is not limited to flange type connections or as shown. The art and my prior art shows other means of connection between two lengths of pipe-liner 377.

FIG. 8 shows a cross section and FIG. 8a shows a longitudinal section of an embodiment of this invention wherein the tubular pipe-liner 377 is found as in FIG. 7 and in addition has spiral wrapped reinforcement 70 provided on the exterior surface of pipe-liner 377. This reinforcement 70 is made of glass fibers or of synthetic fibers or of metallic wires or in fact any other useful material.

FIG. 9 shows a cross section and FIG. 9a shows a longitudinal section of another embodiment of the invention wherein in addition to the construction of FIG. 8, these reinforcing means employs longitudinal prestressing cables 71. The cables have end-enlargements 171 in which bearing holes 172 are found and are shown in my U.S. Pat. No. 3,111,569. While FIG. 8 shows concrete 1 representing conventional concrete, FIG. 9 shows concrete 10 comprising a functional concrete particularly adapted to balanced designed prestressed preloaded constructions. The composite pipe of this embodiment comprises prestressed preloaded pipe adapted to substantial resistance to internal and external pressures.

FIG. 10 is another embodiment of the invention wherein prestressing cable-form 71 is utilized in spiral type wrapped constructions on the outer face of the tubular pipe-liner 377. These reinforcing means provide prestressed structure in the composite concrete pipe, tanks and vessels, etc., of this invention. Concrete 12 of FIG. 10 represents still another kind of concrete 1 of this invention and may be a concrete made by using polymerizable polymeric resin composition as the binder and omitting the use of Portland Cement. In this case specialized aggregate may be used. Such aggregate could be heat resistant mineral material, pumice or tufa, or volcanic ash, carborundum, aluminum silicate, lead minerals, lead powders, metal granules, or could be glass beads, quartz particles, silicon carbide particles, asbestos, antimony oxide, calcium carbonate, calcium sulfate, magnesium carbonate, microspheres made of high silica glass, pure silica, phenolic, urea-melamine or syntatic foam materials, rock or manmade aggregates, lightweight concrete aggregates, such as fire expanded shale or fire expanded clay, etc. Inorganic hollowbeads, aluminum powder and silicone or phenolic resins can be used in specific constructions of the invention. Sodium and potassium silicates silica sols, oxysulfate and oxychloride cements, calcium aluminate cements and phosphate cements can be used as bonding and binding agents. Low-density inorganic materials such as lightweight ceramic aggregate, amorphous minerals such as tripolite, infusorial earth, silica, perlite, oolitic limestone, pisolitic bauxite and heat-expanded mica or vermiculite can be used. Graphite can be used in making heat resistant polymeric resin bound concretes.

FIG. 11 represents a cable-form having two end-enlargements 171, two bearings 172 and continuously wound under uniform tension fibrous strands 71 and is as shown in e.g., in my U.S. Pat. No. 3,111,569.

FIG. 12 represents a roll of belt-form reinforcing showing element 3 as a protective cover and element 74 as unidirectional strands of reinforcing material. This embodiment is shown in my U.S. Pat. Nos. 2,671,158, 2,951,006 and 3,111,569 with improvements. These ready-for-use constructions when provided in tubular construction as in pipe-liner 377 make component parts of the instant invention. The practical use of glass fibers and polymeric resin compositions and other materials of this invention in some embodiments of the new art herein is only possible by means of packaged-ready-for-use components disclosed herein.

FIG. 13 is a partial section of a venturi shaped forming means adapted to pressure fluid systems, the venturi section being shown at 1300a with 2300 representing the forming chamber of a piece of apparatus as shown in FIG. 14.

FIG. 14 is a longitudinal cross section partially shown with a cross section of the apparatus circular in section interposed between the two ends of the embodiment. This apparatus comprises a steel or aluminum mandrel, or in certain uses a reinforced plastic tank, or a reinforced rubber inflatable mandrel about which pipe-liner 377 is made, or is completed from a partially prepared state as supplied on a reel-unit. The outside of the mandrel 236, e.g., could be 12 inches, 16 inches, 18 inches, 24 inches, 30 inches 36 inches, or in fact any required diameter bore for a composite pipe of this invention. As element 2366 used in the manner of the invention of element 236 in FIG. 5, but without the attached hose 223, this embodiment of apparatus provides fluid or air pressure by self-contained means to inflate pipe-liner 377 when it is desired to include air or fluid pressure in the process of making.

This tank 2366 provides air or fluid pressure to inflate the tubular pipe-liner 377 and aids in release of the said pipe-liner from the mandrel by providing a layer of air between the mandrel surface and the pipe-liner 377. Element 2301 comprises an orifice device having port 2303 and feed device 3061 contained in holder 3071 which is secured by portions of said tank element 2366 by its own walls being inverted inwardly by shaped portion of said tank element 3041. The wall thickness of the tank element 2366 comprising said mandrel is related to the pressures required to withstand its internal pressure capability.

The length of tank element 2366 as a mandrel is such that a portion of the continuous length or a long length of tubular pipe-liner 377 is expanded from the flat as it comes from the reel-unit shown FIG. 5 and as it is formed into shape between spray guns 304 and 310. The length may be convenient to a balanced designed set of apparatus provided on the transporting means of the invention. A convenient length may be 10 feet long, or 30 feet long, but not limited to said lengths. The curing time of the polymeric resin compositions of the tubular pipe-liner 377 determines the amount of product made at any given time, i.e., taking into account the related features of the making of composite concrete pipe by the apparatus of this invention.

FIG. 15 shows a cross section and FIG. 15a is a longitudinal elevation like the longitudinal reinforcing means used in the structure of FIG. 9. The spiral wound element 74 surrounds the enveloped tubular construction pipe-liner 377 and is spaced at intervals in accordance with a structurally engineered design. The prestressing cable-forms are shown in raised relationship to the surface of the pipe-liner 377 and add strength to the composite concrete pipe structure. These cable-forms also provide resistance against pullout of said pipe-liner 377 by mechanical bond. These prestressing cable-forms 71 have end-enlargements 171 which have bearing holes 172 so that the cable-forms may be end-anchored and prestressed preloaded by means of the prestressing jacks, the support bulk-head, the jack holding bulk-head and the back-up bulk-head shown as elements 907, 909, 910, and 911 in FIG. 20. The tubular construction pipe-liner 377 is comprised of elements 2, 3, 21, and 121, of the invention.

FIG. 16 shows a cross section and FIG. 16a shows a longitudinal elevation of the reinforcing means used in FIG. 10. In this embodiment, element 3 represents the envelope enclosing the tubular construction pipe-liner 377. Cable-form 71 is shown as spirally wound at an obtuse angle about the outside of element 3. Element 93 comprises a reinforcing-spacing chair holding belt having attached thereto chairs 91 at a preselected spacing. In these chairs 91, prestressing cable 71 is disposed so that an evenly spaced reinforcing prestressing construction for the pipe-liner 377 can be made. By using two (at least) of these elements 93 as reinforcing-spacing belts, parallel arrangements of spirally wound cable-forms are easily provided. If spirally wound cable-forms are not desired, the same elements 93 may be used to provide parallel spacing to the reinforcements 71. Additionally, the spacing belts and chairs therewith can be utilized to place cable-form reinforcements at a desired distance up from the surface of the pipe-liner 377 in carrying out certain structural engineering requirements by having the height of a particular chair used act as the spacing medium. Such chairs can be made out of relatively inexpensive plastic, e.g., polyethylene or vinyl chloride resins, etc., or may be wire or stamped out of metal.

FIG. 17 is an elevation of element 93 comprising a reinforcing-spacing belt. Made in linear lengths it can be cut to specific lengths and is connected by means of any useful type, e.g., rivets, or bolts, or adhesives as shown in element 92.

While known in the art devices such as thermostats, electrical switching circuitary, and actuating devices comprises elements of the apparatus that facilitate operation of various components of the invention. Automation devices particularly in winding fibers in the various winds of helical, linear, or circular winding are most useful. The holding of mandrels in position inside of a length of pipe-liner 377 then being processed is accomplished by proximity switches and electronic devices and magnetic elements operated from outside of the molding means 241 or equivalent means. The fibrous reinforced polymeric resin composition can be selected that provides no interference to such operation, e.g., valve 2301 being operated by electronic device shown at 2302 in FIG. 14.

Stressing means for stressing fibrous or metal constructions comprise mechanical means such as hydraulic jacks 910 known in the art of prestressed preloaded structures as well as devices of my own invention are used in inducing mechanically applied preload into cable-forms 71 through their end-loop-enlargements, as e.g., 171. Stressing means provided by heat generated during the polymerization reaction of polymeric resin compositions of this invention which provide exothermic heat as well as sensible heat applied to raise the temperature of the polymeric resin compositions to cause polymerization from ambient temperature, also is a component part of this invention. Staging of heat input as in B-stage use of fibrous reinforcement embedded in polymerizable polymeric resin compositions is useful and explained supra. Heat added to the inside of a mandrel e.g., an aluminum mandrel, causes an expansion of the mandrel and this stresses the wound fiber, e.g., glass fiber rovings, or woven tapes, or strands, and this when the polymeric resin composition is set captures prestressed preloads into the construction. Mandrel made with overlapping segments and having expansion means inside of the mandrel also provide stressing means of this invention. Glass fiber or in fact any other fiber used, or wire used, can have its structural engineering properties improved with prestressed preload calculated and provided in accordance with a preselected structural and chemical engineering concept of structure.

In certain construction embodiments of this invention because of the restraint exercised by the end-anchorage means against a bulk-head, e.g., element 907 and element 911, the cable-form 171 enlargement being set in a slot which passes the cable-form 71 but not the enlargement 171 (said slot not being shown), through said bulk-heads, the force system provided by the shrinkage of the resinous material and/or the concrete 1 material of a particular embodiment then being made is a means whereby the pipe construction as composite structure is prestressed preloaded.

In B-stage systems the chemical engineer in a plant insures by formulation and quality control means the integrity and the uniformity of the polymeric resin compositions and of the reinforcing means of the B-stage materials.

FIG. 18 shows an enlargement of one element 91 mounted on belt 92. Element 91 provides spacing means for prestressing cables 71. Belt form 92 as shown in FIG. 17 serves to maintain prestressing cables 71 parallel to the main flow of the pipe line while in FIG. 16 the belt-form of FIG. 17 by means of element 91 holds the helically arranged cable-forms 71 at any preselected line of pitch. The embodiments shown are not to scale but no limitation in size is intended.

FIG. 19 is an enlarged sectional view of a pipe-liner 377 in various stages of processing. Generally mandrel 236 is shown inside of the pipe-liner 377 with the oven 241 surrounding the pipe-liner and mandrel 236. The mandrel 236 has a rounded front end which has an orifice 235 which is operated by apparatus inside of the mandrel 236 by means outside of the oven 241 comprising an electronic device similar to that shown in FIG. 14 as element 2301. Additionally, ports 234a and 234b are operated by similar devices. Elements 257a and 257b represent magnetic holding plates as described *supra*, and are shown here in the surface of the mandrel. In this embodiment they have highly polished or chrome plated surfaces, but when I place the device inside of the aluminum shell of a mandrel, these devices may be ferromagnetic materials. The fluid or air hose 223 is shown in FIG. 19 but alternatively, the mandrel of FIG. 14 may be used.

As shown in FIG. 19, elements 243, 244 represent pressure means components of the oven 241, the depressions 277 and 278 in the pipe-liner 377 being exaggerated in depth in order to by the drawing that this pressure means holds the mandrel in position during processing. Platen 237 is heated by heating elements 281 and insulation material 239 retains the heat in the oven 241.

Element 310 represents means of providing polymerizable polymeric resin composition into the fibrous reinforcements of the invention. The apparatus is substantially circular in being around the tubular pipe-liner 377, or can be a segmented construction around the pipe-liner 377, or other shapes, e.g., elliptical, etc., tubes. Element 304 represents means of applying bonding material 78 to the pipe-liner 377 surface for bonding to the concrete 1 at the interface of the pipe-liner 377 and the concrete 1. Additionally, at 701 is shown tank means which provides bonding material 79 which adheres to bonding material 78 and may be sand, or sand and Portland Cement, or in fact any other selected material used to unite the pipe-liner 377 at its interface with concrete 1. Spray unit 303 is similar resin dispensing means as element 304. While spray type units are shown other means may be used, such as dipping impregnating, adhering or placing said bonding materials. In certain embodiments, ribbed or otherwise provided bonding or holding means may be used, and elements 78 and 79 be omitted from the process, from all or only a portion of a composite concrete pipe construction of the invention.

Element 700 represents the concrete 1 dispensing means of the invention and is provided by known means or by improved concrete placement means of my invention. The elements 78 and 79 displace portions of the concrete 1 placed over them and at the interface make a composite material out of the concrete 1, the polymerizable polymeric resin composition 78, and the sand, or the sand and the Portland Cement 79. Water from the concrete 1 sets the Portland Cement which is applied dry. Earth 119 is a component of the construction because concrete 1 is placed on 119 in a wet condition and at the interface between the concrete 1 and earth 119 particles of each comingle and provide unitary structure. When resin-crete or elastomer-crete concrete 1 is used, the flowable mix of the same also bonds to the earth of the trench and makes unitary structure. If loose earth is encountered in the trench as dug, an amount of polymeric resin composition can be applied by means, e.g., mopping or spraying, etc., and the earth stabilized.

Care must be taken in making the composite structure of this invention. A water soaked trench of earth 119 being in a "too-wet" condition could "rob" the concrete 1 of some of the Portland Cement by capillary forces. Resorting to non-Portland Cement binder, e.g., polymerizable polymeric resin composition or polymeric resin composition and fibrous reinforcements shot onto the face of the trench by a resin-fiber-gun known in the art can solve such a problem.

FIG. 20 shows a general view of the pipe-liner 377 as made on the trailer 306 (or on a boat) and being deposited in an earth's environment. Additionally, in FIG. 20 is shown means of prestressing a portion of said composite pipe-line. Cable-forms 71 are disposed in preselected spacing around the pipe-liner 377 and are stressed in prestressed preload by means of apparatus 907 end bulk-head for restraining cable-forms 71 by holding end-enlargements 171 by means, e.g., slots not shown, and apparatus elements 909, 910, and 911 which comprise prestressing means. Element 909 being a bulk-head against which hydraulic jacks 910 bear with element 911 being the restraining bulk-head holding the prestressing apparatus in restraint. Cable-forms 71 are pretensioned to a pre-selected preload and this load is captured in place by concrete 1 when it sets. When the cable-forms 71 are placed in jacketed construction and are made of glass fiber unidirectional strands as shown in the drawings herein, these strands may be pretensioned in their dry state or in their wet state having polymerizable polymeric resin around and about and into the spaces between said strands. When the concrete 1 is poured about said strands the polymerization reaction may be actuated by means, e.g., slow acting catalysts activated by the heat of the reaction of the concrete 1 on setting, particularly when concrete 1 is resin-crete or elastomer-crete concrete, or by any other means known in the art.

In the placing of pipe-liner 377 as shown in FIG. 20, the nature of the degree of set or curing of the pipe-liner 377 can be a feature of the placement. When partially cured polymeric resin compositions as disclosed herein are used, the additional exterior coatings and bonding agents provided have an intimate bond in certain of the polymeric resins supplied and as e.g., partially cured epoxy-polyamine polymeric resin composition will readily bond with additional resins of similar properties which are applied at 78. Alternatively, fully bonded and cured layers of a construction of pipe-liner 377 may have the layer next to the mandrel in fully cured condition while layers thereof and thereover are in a partially cured condition so integration of structure will obtain in process.

Referring to FIG. 21, this apparatus of the invention comprises a trailer or truck type vehicle (or a boat) for transporting the apparatus to the site of use. Such a trailer or truck-type vehicle then travels and straddles or parallels a pre-dug trench and lays into the trench a predetermined and preselected sized and structurally designed tubular construction pipe-liner 377. If the apparatus is on a boat the pipe-liner 377 is deposited in an earth's environment below water or in a trench dug below water. The pipe-line may be an oil field pipe-line, an irrigation pipe-line, or a chemical process line, etc., in place of use. If it is not convenient to deposit the pipe-liner 377 directly into the final place of use as made on the apparatus of FIG. 21, such a pipe-liner 377 in ready-for-use condition, or partially made in ready-for-use condition can be placed onto a reel-unit and utilized in FIG. 5. The combination of making the pipe-liner 377, reeling and storing on a reel-unit and then placing into a trench or earth's environment may be employed by placing a reel-unit after the making mandrel portion of the apparatus and connecting to the forming mandrel of the apparatus. With either method of making or supplying the pipe-liner 377 sub-assembly or full assembly of components may be utilized so that pipe-liner 377 is deposited into the earth's environment and covered with a protective cover comprised of concrete 1 as broadly defined herein or the pipe-liner may be used as a pipe-line with the earth wall of the trench bonded thereto as shown herein.

Element 90e represents a diesel-electric power source or equivalent for heat and power.

In FIG. 21, element 2367 represents a forming means mandrel which is shaped like a torpedo upon which e.g., polymerizable polymeric resinous material 21 is placed and in which embedded glass fibers 7 are wound at a preselected helical angle or otherwise determined "lay" of the fiber 7, e.g., circularly layed fibers 7 over a lay and cross-lay of helical wound fibers 7, or e.g., longitudinally layed fibers 7 under a lay of helically wound fibers 7 followed by a circularly layed layer of fibers 7 followed by a lay and cross-lay of helically layed fibers 7.

As a first element 9 comprising a release sheet or release means, or a thermoplastic polymeric resin composition component of pipe-liner 377 for a given structurally and chemically engineered construction for purposes of corrosion resistance, or other functional use, element 9 is wound or is placed on said mandrel 2367. Element 9 may be of thermoplastic material or of thermosetting material, or of a composite material, or may be comprised of polyethylene, or vinyl chloride resins, vinyl resins, or of polyethylene terephthlate, etc., or of rubber, silicone rubber, butyl rubber, etc., or in fact any material providing a functional use as a first layer liner of the pipe-liner 377. These may be strips of material, webs, strands, or preformed tubes of release material used for release one or more times, or may be material incorporated into the structure of the pipe-liner 377. Such functionally used material is exampled by that of providing a resilient liner feature as e.g., using neoprene rubber, or butyl rubber, or chlorinated polyethylene, or polycarbonate, proprietory thermoplastics, or rubbers, as a first layer. Such layers may be supported on the mandrel by peel-off type layer of polyethylene film wound onto the aluminum in strip form and if desired heat sealed connected strip to strip as wound around the mandrel. Such a first layer would insure air tight construction for inflating pipe-liner 377.

The mandrel 2367 is secured in a substantially built holding device 15 which is so designed that the mandrel element is maintained in cantilevered position fixed in place. In this embodiment the mandrel does not rotate. Adjacent to device 15 end frame 63 supports fixed in place creel holder 5 upon which rovings 7 are placed. These reels of roving 7 are so placed that the roving strands, e.g., glass fibers 7, are fed through polytetrafluoroethylene (Teflon), or glass or porcelain fitted eyes 3 and then placed over release material, e.g., polyethylene element 9 and said fibers 7 are drawn forward for linear reinforcing in this type of embodiment. Such reinforcing linearly placed is in addition to helical and/or circularly placed roving or other winding pattern.

The second stage of the manufacture on this apparatus starts at frame 62. On frame 62 there is a revolving ring assembly 10 which is secured to frame 62 by holding ring 12 which has means for holding as well as means to enable ring assembly 10 to revolve on said holding ring 12.

Upon revolving ring 12 a plurality of spindle holders 14 are mounted. Upon these spindle holders 14 there are placed roving balls of glass fiber 7 or spools of synthetic fibers or wire. In some cases different reinforcing materials will be placed alternately or otherwise on the spindle holders 14 so that a composite reinforcement and pipe-liner 377 structure will result and be built on the apparatus. Such composite reinforcement could be glass fibers unidirectional strands 60 end 150's Owens-Corning Fiberglas glass fiber roving and next to it on alternate spindle reels could be placed #30 stainless steel wire. Many composite reinforcements are thus available and no limitation is intended on the possible combinations. Structural engineers can and will design many kinds of composite structural embodiments.

Revolving ring 12 is driven at a preselected speed by motor 17 which drives shaft 68 which drives gear 16 which drives chain 10. Revolving ring 12 is arranged so that fibers 7 are helically or otherwise advanced on the release agent e.g., a proprietory release spray of silicone or wax or e.g., polyethylene film which covers the mandrel 2367. These fibers 7 are layed in one or more layers to build up the required structural cross section of reinforcing material. The fibers 7 are layed in a layer of polymerizable polymeric resin composition to embed them. A revolving ring 12 is mounted on frame 61 and feeds its roving fiber 7 lays back under spray guns 40 and 41 or may be pulled through an impregnating tank of resin composition while revolving ring 12 mounted on frame 62 feeds its roving fiber 7 lays forward onto mandrel 2367. This makes a composite lay of a plurality of strands of roving fibers 7 as the polymeric resin composition 21 used for bonding and binding the fibers 7 one to the other is applied onto the lays of fibers 7 from spray guns 40 and 41 or by any other equivalent applying means. Thorough covering and embedding of the fibers is what is required and other applying means can be used, or the fibers 7 can be preimpregnated with all or a part of the particular resin compositions used.

Variations in sequence of laying fiber 7 can be made so that many particular and different reinforcement constructions can be made. The polymeric resin compositions such as unsaturated polyester resins, or epoxy resin compositions, or polyurethane resin compositions, or polyvinyl chloride resin compositions, or compatible thermoplastic and thermosetting resin compositions used in combination can be cured by heat, by ambient means, by sunlight, or other known means. Useful for this purpose are electrical radiant heating devices as made by Edwin J. Weigand and Company, Pittsburgh, Pennsylvania. The mandrel may be heated by hot air blown into the mandrel 2367. An aluminum mandrel is a good heat transfer means. The hot air blown into the mandrel heats the aluminum metal and this in turn transfers heat into the laminated layer 777 as it is placed on the mandrel and/or as it is drawn across the mandrel by means, e.g., rubber faced or other friction type material of the powered belt 31. Belt 31 is powered by electric motor 30 and belt 33 is powered by motor 32. Alternatively, a single power source and shafts and belts or gears can also provide the driving means of such apparatus. If required, a plurality of takeoff means can be provided. In place of winding element 9 onto the mandrel to provide a one time release agent for removing pipe-liner 377 from the mandrel, a release means comprised of polytetrafluoroethylene, Teflon, can be applied to the mandrel surface as a reusable release agent.

The mandrel 2367 is slightly tapered for a portion thereof near its outward end. Air pressure pumped into the finished product 777 either as a fully cured product or as a partially cured product as hereinbefore described, comprises means designed to assist the releasing of the pipe-liner 377 as it is moved into the trench or other earth's environment or is removed in sections of desired length. A cushion of air aids also in prestressing. When the product is of thin section and unable by itself to support the concrete 1 in its flowable state as placed over pipe-liner 377, 3 to 10 lbs. of air pressure, but not limited thereto, is pumped into the pipe-liner 377 and this air acts as a support means for concrete 1 component and this while it lays in the trench. The ends of pipe-liner 377 are closed as in the embodiments shown herewith. End means of closure may be provided by end plugs having gaskets and holding means known in the art. Alternatively, a sealed dome-like end plug can be formed on the pipe-liner 377 making it into a tank-like construction or a vessel. Part 55 in the outward end of the mandrel is sized and valved, if desired, to regulate the flow of air into pipe-liner 377. The air pressure or fluid is provided, e.g., from air compressor 50, or the like, through pipe into end port of mandrel 2367 and valves may be provided at the intake end to control this pressure.

Of importance in one embodiment of the invention, the pipe-liner 377 is made as a continuously advancing component of the structure of the composite concrete pipe of this invention. As the trench is dug by ditching means shown herein, the pipe-liner is placed directly into the trench from the making means, and in some embodiments, the pipe-liner 377 is covered and coated with bonding and binding agents as herein disclosed as elements 78 and 79 provided to strengthen and improve the structure at the interface between the pipe-liner 377 and the concrete 1 components of this invention. When certain concrete 1 mix designs are made with polymerizable polymeric resin compositions the pipe-liner 377 and the resin-crete or elastomer-crete concrete become unitary structure all bonded together. No limitation and no restriction is intended in the end use products made herein.

FIG. 22 shows a diagrammatic elevation view of frame 62 and the roving ring assembly 12 having fiber 7 reel holding means 14. Fibers 7 are shown being drawn from their spools through a porcelain or other material eye means 3, and from eyes 3 onto the mandrel 2367 so that lays of fiber 7 are built up to the required thickness to make pipe-liner 377. Additionally, when required by a design, longitudinal fibers 7 are advanced as the fibers 7 are spun helically, or otherwise onto mandrel 2367. Motor 16 drives shaft 68 by means of chain drive 17 over sprocket on said shaft 68. This is also shown in FIG. 21 and shaft 68 and apparatus thereof is shown as driving revolving ring 10 on both frames 61 and 62.

On FIGS. 21 and 22 there is shown polymerizable polymeric resin composition disposed in tanks 21 and from these tanks formulated polymeric resins, or rubbers, or elastomeric or rubbery compositions are drawn and placed by spray means illustrated by elements 40 and 41. Alternative means known in the art may be used to dispense these materials. Alternatively, but not shown, the fibers 7 may be drawn from and through a creel device which has in combination a filament wetting and impregnating means. This means can be provided to control the amount of polymeric resin composition, etc., used for binding the strands of fiber 7. Such fibers 7 may be unidirectional strands of glass fiber roving, or tapes, or other material, and may be tensioned by the apparatus. Typical of such apparatus as components of this invention apparatus are "Kidde Creels," of the Walter Kidde Company, of Newark, N.J., or equivalent means. Such creels can simplify fiber handling and can be equipped to deliver e.g., 200 ends of single or plural end yarn or rovings and also provide tension devices adapted to inducing preselected amounts of tension into fibers 7.

As is known in the art, controlled tension compensators can be used which compensators provide a highly controlled fiber filament laying means. The use of compensator provides accurately controlled tension on unrolling or drawing of glass fibers as woven tape roving or as unidirectional strands whether in a dry state or in a preimpregnated state. Any useful fiber 7 can be controlled for "pay out" on an accurate basis method.

A servo system may be employed as a closed mechanical loop acting through roller arms which serve as the sensing element not shown but known in the art. A braking system is provided which constantly adjusts itself by responding to the movement of the roller arms, which adjustment is transmitted back through a feedback cable. Filament winding of fibers 7 is provided with known device which has exceptionally good acceleration characteristics, due to time delay provided by the storage capacity of the roller arms of apparatus available but not shown. Sensing rollers may be used having a polytetrafluoroethylene coating, (Teflon) sleeves, or hard anodic coating, or in stainless steel.

The apparatus enables any helix angle ranging from 0° to 90° to be selected and incorporated into an accurately controlled pattern. High winding pattern is governed by separate gear trains or train which may be engaged when required during fabrication. An angle of 54.75° winding in lay and cross-lay positions pitch will develop in the wound construction about equal hoop strength and longitudinal strength. Other angles of winding are known to provide specific features of structure.

With fiber 7, or as alternate materials for winding purposes there may be used tapes of various constructions and preselected widths, e.g., woven glass fiber roving tapes, jute, cotton or burlap woven tapes, or wire, or wire and glass fiber tapes, in fact any materials alone or in desired engineered combinations can be used as ready made tapes and placed by means of this invention apparatus.

FIG. 23 shows an elevation of frame 63 looking toward the beginning end of mandrel holder 15. Mandrel holder 15 is a strong construction adapted to support mandrel 2367 in a cantilevered position as shown in FIG. 21. Holder 15 is shown having a circular opening of the size of the largest type of mandrel that the apparatus is designed to use. For example, if the largest size mandrel 2367 will provide a pipe-liner 377 of a 60 inch diameter and have a 2 inch thick wall, the holder will have a dimension diameter of 64 inches. From the dimension diameter of 64 inches of holder 15 any smaller sized mandrel 2367 may be used by means of supports 73 shown in FIG. 23. These supports may be screw jacks, or hydraulic jacks, or air pressure devices, wedges, or other apparatus provided to hold rigid and in place the size mandrel then being used. The drawings are so drawn to in some instances "stretch out" the apparent details and dimensions thereof, but it is contemplated that the apparatus can be substantially condensed making for more rigid and accurately working apparatus. The trailer or truck bed 72 is shown supporting frames of the apparatus as e.g., frame 63. Tires or other moving means e.g., caterpillar tractor means, etc., is represented by element 75.

Tanks can be made on a continuous production basis and such construction cut to desired lengths at will and have end closures bonded into place. Concrete pipes can be made of other than circular shapes by changing the shape of the mandrel. Pile constructions can be made wherein pipe-liner 377 becomes the reinforcing and protective cover for concrete 1 solidly poured into the inside of pipe-liner 377 and may be fitted for a driving shoe so the pile can be driven into bearing.

In this FIG. 21, the apparatus can provide that the laminated pipe-liner 377 may be drawn across or from the mandrel 2367 by means of rubber faced or otherwise adapted friction inducing takeoff belts such as belts 31 and 33. In place of individual motor drives these powered belts 31 and 33 can be powered by phase gear control takeoff from a single power source which would drive both rotating rings 10 and takeoff belts 31 and 33, thus maintaining mechanical integrity throughout the fabricating cycle. This feature is particularly important because variations in helical angles can be readily made without having to synchronize elements of the apparatus. Belts 31 and 33 then automatically adjust to forming speeds and laying speeds of the fiber element 7 placement.

The ease with which helically formed fibers are made on this apparatus also provides with another type revolving ring apparatus the capability of making sleeve-type interwoven constructions from fiber contained on reels mounted on this revolving type ring as shown in FIG. 24. The revolving ring 12a contains grooves 8 and 8a in which unidirectional fiber strands 7 travel in opposite directions so these said fibers 7 are placed on the mandrel 2367 as woven sleeving 799. Such sleeving can be made to adjust in diameter because wet impregnated fibrous construction can be formed by pressure means. A construction may be made by the apparatus of this invention which includes expanding a pipe-liner 377 type of product or a specifically designed formed product that may be enlarged or formed against a containing die mold and by means, e.g., air pressure, made to the shape provided by the die or mold.

The mold or die may encircle the mandrel 2367 and be a circular shape or as is required in making a venturi section of a pipe-liner. The mold or die may be irregularly shaped to conform the wet impregnated fibrous construction contained e.g., in a sleeving type construction wound onto a pipe-liner 377 or 777 and provide a manhole element of a pipe-line, or make formed products of many types, e.g., tanks, storage vessels, car bodies, boats, military material, chemical vessels such as funnels, process vessels, etc.

The invention provides pipe-lines having, variations of structure thickness as well as directional resistance type reinforcements i.e., placing "muscle" strengths in the most advantageous location in a pipe-line structure. It has ability to provide bonded and integrated reinforcements that are structually designed components parts of structure. Fiber 7, e.g., multidirectional glass fiber strands, rovings, glass fiber tapes, polyethylene terephthlate strands, nylon strands, butyl rubber bands, elastomeric rubberyfibers and bands, polyethylene strip sheets, polypropylene fibers, strands and sheets are used with epoxy resin bonding and binding resin compositions, unsaturated polyester resin compositions, urethane resin compositions, phenolic resin compositions, and in fact any other polymeric resin composition to comprise a particular feature of structure of this invention, or which in combination with compatible materials provides particular features of this invention. Metal inserts, metal reinforcements, synthetic fibers and fillers, mineral fillers of many kinds can be incorporated in specific formulated polymeric resin compositions and are capable of being placed by the apparatus of this invention.

Air compressor 50 and the holding tank 51 provides means of inflation of elements shown in FIG. 24.

Payout device belts exampled by elements 31 and 33 may be additionally provided by guide contour shapes, e.g., a venturi section of a pipe-liner 377 can be frictionally moved from the mandrel or the mold or die upon which its shape depends and is made. No limitation is intended as to the shape of dies or molds within the capability of the removal of a product made on this apparatus. The machine apparatus is not limited to circular pipe-liner shapes but any reasonable shapes such as squares, triangular shapes, elliptical shapes, or depress elliptical, spheroid, paraboloid, conical shapes, or combination of shapes may be made in continuous process constructions by the apparatus of this invention.

This invention can supply military pipe-lines manufactured in the field, or manufactured nearby and placed in the ground or other earth's environment for protection by ditching and back-filling of dug earth. The pipe-lines may be used for supply lines for water, fuel, or other fluids, etc., Protective cover to the pipe-liner 377 component of the invention can be provided by polymerizable polymeric resin compositions mixed with the dug earth to form the concrete 1 of this invention.

The apparatus and method of this invention is so used that each piece of apparatus is connected by design to the necessary maintenance of continuity of construction. The ditcher mounted on a tractor device first digs the ditch and in one embodiment of this invention, a cable attached to the ditcher and the pipe-liner 377 manufacturing apparatus mounted on a mobile platform of the nature of a trailer or truck is drawn forward as the tractor of the ditcher is advanced providing a dug ditch. The pipe-liner 377 manufacturing apparatus on its conveyance deposits pipe-liner 377 into said ditch. Attached to the pipe-liner 377 manufacturing apparatus is the concrete 1 placing machine and as the pipe-liner 377 is layed in the trench it is fed into the concrete 1 placing machine and/or the concrete placing machine advances over the pipe-liner 377 and centers it in the concrete placing machine entrance opening and then deposits concrete 1, or resin-crete or elastomercrete concrete 1 around, about, over and under the pipe-liner 377 and completes the composite pipe construction of this invention. Added features may be interposed as e.g., prestressing features as shown in FIG. 20 or any other features disclosed herein.

Alternatively, the pipe laying operation may be carried on by digging the ditch and providing the pipe-liner 377 apparatus selected lengths of pipe-liner 377 which may e.g., have a bell-type end on one end and a spigot type end on the other end and which lengths of pipe-liner are joined together on the moving pipe-liner supplying vehicle by bonding means exampled by quick-setting polymerizable polymeric resin compositions or other joinery means and are then placed into the trench as a continuous pipe-liner 377 construction.

FIG. 26 shows bell and spigot type pipe-liner 377 which embodiment will be required for use with machines now making poured-in-place concrete pipe-lines, but not all machines. The mandrel is fitted with an integral shaped band 228 by which the bell portion is formed on the pipe-liner construction. As shown it is part of the mandrel but alternatively, the band may be a part added to the mandrels 236 or 2367. The taper end of the mandrels 236 and 2367 provide the spigot portion by merely extending the winding over onto the sloping portion of the mandrel for a reasonable distance, e.g., 4 inches or 6 inches. The pipe-liner is described and shown in FIG. 25 or it can be as otherwise shown herein. Element 67 represents a polymerizable polymeric resin composition bonding adhesive used to connect the pipe-liner lengths together on the pipe-liner trailer or on the ground or in the trench. Spigot 227 nests directly and easily into bell 228 and when bonded together the joinery is stronger than the pipe itself.

In FIG. 14 an additional element can be added to hold the pipe-liner 377 in position in the oven or processing. Element 95t is a thin rod passed through from the outside of the oven 241 or equivalent means that pierces the pipe-liner 377 and holds it in position during the curing cycle in the oven 241. As the pipe-liner 377 leaves the oven and passes through spray or applying means 302 to receive the bonding resin composition 78, the holes caused by the thin rod 95t are filled with said resins, and if necessary, a piece of glass fiber mat or equivalent is also placed over the holes. The system works as a continuous system with increments of the pipe-liner 377 being cured partially or being cured fully on the interior surface but partially on the exterior surface. When the pipe-liner 377 has an unsaturated polyester resin composition binder and the bonding resin composition 78 is an epoxy resin composition, the pipe-liner 377 may be fully cured because excellent bond is had between the two polymeric resins. Other resin systems can also be used thusly as is known in the art. Variations in processing can be had and no limitation is intended.

The apparatus shown herein is provided with practical means of tension programming for developing maximum physical properties of the glass fiber or other fibers in use in making the pipe-liner 377. Many systems of the prior art do not consider the values lost in handling the fiber from original packaged roving or fiber into its final end use. Three basic apparatus functions must be so designed that (1) tension, (2) impregnation, and (3) placement or guidance provide reproducibility substantially every time the apparatus is worked. The fibers as e.g., glass fiber roving, must be delivered to the mandrel having uniform strength and under controlled conditions of tension, etc. Variations in tension must be held to a minimum and the tension from roving to roving, or strand to strand, and from end to end must be substantially uniform with the overall amount of tension level being adjustable by proper devices, i.e., automatic devices.

Impregnation of fibers, e.g., glass fiber rovings may be done ahead of the onsite manufacture, or the fibers may be brought to the site already impregnated. The degree to which impregnation of fibers of pipe-liner 377 as delivered in reels for use as in FIG. 5 may be none to full impregnation. Alternatively, additional polymeric resin composition or compositions 21 may be provided as in FIG. 5 to dry pre-packaged and oriented and "built-up" fibers of the pipe-liner 377. In wet winding the roving or fibers must be substantially completely impregnated with resin as it passes through the fiber delivery system or means. Fiber by fiber must be layed down so there are no voids or holes and at the same time no excess of resin composition should remain on the roving fibers. The apparatus provides means to substantially hold the polymeric resin composition constant in percent of content and the apparatus is adjustable by known means to do this.

To speed up winding the individual rovings or fibers, e.g., glass fibers, apparatus may be used as is known in the art to collect rovings or fibers into ribbons or tapes and winding a plurality of individual rovings or fibers onto the mandrel 2367 as in FIG. 21. A wet winding system adapted to use on the apparatus of FIG. 21 requires spool or holding means for roving spools, or yarn holder, a tensioning means device, and impregnation system and device, and a pay-out means device for the roving or fibers used. If the roving or glass fibers are already preimpregnated with polymeric resin and ready for use, a heating device will be used to heat the preimpregnated roving or fibers to liquify the polymeric resin composition from its B-stage condition just before it is layed on the mandrel. A filament delivering system can be numerically controlled filament winding machine which consists of spool holders, a tension and impregnation unit in combination, and a payout device, with the control resting in orifice controls and intermediate guides such as combs, rollers and pattern making controls.

In FIG. 25 is shown bell and spigot type of pipe liner 377 that may be made on the apparatus of FIG. 5 and FIG 19, and on FIG. 21 herein shown. Preselected lengths of pipe-liner 377 are made as above described and in this embodiment element 97 comprises a bell portion of the pipe-liner 377 and element 227 comprises a spigot portion of the pipe-liner 377. The bell is made by spinning and winding additional fibers to form the bell 97. The spigot may be straight pipe or may be made by extending the winding over the taper portion of the mandrel 2367 in FIG. 21 while in FIG. 5 the spigot portion is made on the taper portion of the mandrel 236 by increasing the pressure of the apparatus element 244 at 278 as shown in FIG. 19. Simple cutoff means is employed. FIGS. 22, 23, and 24 indicate features of apparatus showing spools and guiding means. The above features of manufacturing involved in tensioning, impregnating and placement or guidance of fibers are represented in these FIGS.

The pipe-liners 377 thus are provided in several structural and chemical engineered constructions. The important feature of having at least an outer portion of the said pipe-liner 377 in partially cured condition with respect to the polymerizable polymeric resin composition used provides a most important contribution to pipe-liner structure in its combination with the composite structure provided with concrete 1 component. When commercial concrete made of Portland Cement, sand and crushed rock aggregates are used, the interface structure and the pipe-liner structure are integrally bonded together by the "fingers" of bonding resin composition 78 and the mechanical and Portland Cement bond to the sand and aggregate at the interface additionally provides strong bonded structure. Additionally, prestressing preloads provided by force systems captured from the polymerization reaction of the polymeric resin compositions, and/or force systems provided by mechanical or thermal means as defined in my prior patents, are provided in onsite manufactured composite pipe-lines. When concrete 1 is manufactured out of concrete aggregates bound together with polymerizable polymeric resin compositions unitary structure is readily obtained. In preventing loss of fluid or water from these pipelines, the closing of concrete pores normal to concrete by the pipe-liner 377 system and by the use of impregnated structure of the concrete by the polymeric resin systems provides improved pipe structure and in water lines stops water waste.

FIG. 27 shows an alternate means of providing the concrete cover 1 to the pipe-liner 377. The concrete placing operation is accomplished by first placing the invert section of the concrete cover 1 into the bottom of the already dug trench, or other earth's environment then being used. This first pour of concrete 1 is spudded and tamped to a desired thickness and then the pipe-liner 377 is placed thereon. Prior to laying of pipe-liner 377, a plurality of concrete 1 wall thickness guides 99, or 99a, or 99b, or equivalent spacers or guides are placed about pipe-liner 377 as selected and may be attached to the pipe-liner 377 by belts 93 or provided in and of belts 93, or other wise, and provide means to establish the designed wall thickness for the poured concrete 1.

If wall thickness guides 99b or equivalent are used, reinforcing cables 71 are placed ready for embedding in the concrete 1 pour as in the use of the reinforcing cable holders shown as elements 91. Element 99b is a dual purpose element in that it acts as a reinforcing cable holder and a wall thickness guide. The same dual purpose can be accomplished by modifications to the other guides shown. With pipe-liner and guides being placed concrete 1 is completely placed.

Quick installation of the wall thickness or expansion guides is made when the belts 93 and the guides are assembled or made in one piece construction and are put on pipe-liner 377 on the pipe-liner trailer or other means and placed into the earth's environment along with the pipe-liner 377. The concrete pouring machine 700 may be used in this embodiment of the invention, other pouring means may have been used.

FIG. 28 shows a dual purpose element 99b having an enlargement at a selected distance from its bottom for reinforcing cable 71. The length of the element 99b is determined by the selected wall thickness of concrete 1, e.g., 3 inches, 4 inches, 5 inches, or 6 inches, etc. Element may be a wire or stamped metal element, a polyethylene cast element, or other thermoplastic resin or thermosetting resin element, be made of wood, or in fact any material useful for the purpose. The element 99b and the belt 93 and be of one piece of material and the element 99b stamped or cut into the belt material and bent into the shape shown in the drawing. If the element 99b is made separately from the belt it can be adhesively attached to the belt, or attached in any other way found useful.

FIGS. 29 and 30 and 31 show alternate wall thickness devices and no limitation is intended since other shapes and devices will be found useful.

In the embodiment of the invention wherein a conduit or pipe-line is designed with tubes placed in the body of the wall of the pipe-line, element 99b can provide the means to hold such tubes in place. In chemical, oil and certain water lines e.g., in salt water conversion water systems, it is desirable to have heating lines about a main pipe-line, or in other systems it is desirable to have an electric conduit system about a pipe-line. Element 99b provides such means to hold in place these internal pipe-line systems in the main wall of the pipe-line of the invention. In radiation systems cooling can be accomplished in pipe-line systems by this means of internally placing cooling piping systems in the main wall of a pipe-line.

Another embodiment of the invention can be made as in FIG. 32 wherein two tubular constructions are used having an inner pipe-liner and an outer cover. The space between the inner and outer tubes is filled with concrete 1, resin-crete concrete, elastomer-crete concrete or a foamed resin 1a such as polyurethane foamed resin polystyrene foam, phenolic resin foam, synthetic resin beads, etc., or vinyl foamed resin. Rigid polyurethane foamed resin provides a strong material useful as a concrete in accordance with the broad definition of concrete of this invention. A pipe-liner 377 as provided on the apparatus of FIG. 5 or FIG. 21 is placed inside of a tubular construction, e.g., a polyvinyl chloride tube, or a construction similar to pipe-liner 377 and noted as element 477, or in fact any of the tubular constructions disclosed herein with a discrete space provided between the two constructions wherein is placed the concrete or foamed resin herein disclosed. The constructions can be continuous long lengths or of selected lengths and may have bell and spigot ends for joinery means.

The concrete 1 or the foamed resin 1a may be pumped into the space between the two tubes and set in place to form the finished pipe-line. For example, a 30 inch diameter pipe-liner 377 can be placed inside of a 36 inch diameter outer cover and have a space for 3 inch wall of concrete 1 or foamed resin.

End closures as shown herein can be used. Wall thickness guides and beltforms as shown herein may be used to provide accurate wall thickness to the construction. Apparatus for pumping concrete and for pumping and providing foamed resin is known in the art and adapted to the uses set forth herein.

The two tubes may be finished on the trailer rig or placed together in the trench and filled in place.

*EXAMPLE I*

Using the apparatus of FIG. 5, FIG. 6, FIG. 7, and FIG. 19 a continuous length of concrete composite pipe-line is made as follows:

A preformed tubular construction comprising spirally wound reinforcement consisting of two helically applied layers of glass fiber 60 and 150's rovings layed on about 54.75° to opposite hands in lay and cross-lay position and having a third layer of circularly wound glass fiber 60 and 150's rovings coated with a B-stage epoxy resin composition is supplied in reel form and mounted upon the reel standard support. To protect the glass fiber a thin layer of polyethylene cover sheet is provided at the point of manufacture where the tubular construction 377 in its partially cured B-stage state is manufactured. The pipe-liner 377 is fed through sizing rolls 372 and 376 and into oven 241. As the pipe-liner 377 is made ready for processing through the oven, it is cut to a substantially true circle cut so that it may be fastened to bulk-head 215—216 as shown in FIG. 7. The pipe-liner 377 is passing through the oven 241 is additionally cured, but not fully cured, and in this condition is able to be self supporting. In this state it is pulled from the oven and down into the trench and into the concrete placing-machine so it may be fastened to the bulk-head 215 —216. The mandrel 236 is placed inside of the tubular pipe-liner 377 before the pipe-liner is fastened to the bulk-head 215—216, as is the air feed line 223. The pipe-liner 377 is cured to the desired stage of cure short of full cure in oven 241 as it passes through in increments equal to the length of the oven and is covered with bonding resin 78 as it leaves the oven 241 from resin applicator 302.

In entering the oven 241 in this example the fibrous construction of pipe-liner 377 has the designed amount of polymerizable polymeric resin composition in its packaged condition on the reel-unit. Heat from the oven raises the temperature of this polymerizable polymeric resin composition 21 and cures it to that state of partially cured state designed to make the pipe-liner 377 self supporting but still adapted to take bonding resin composition 78 and have it become a component of structure on completion of the total curing of the finished product. The continuity of bonded structure at the interface structure of the pipe-liner 377 and the concrete cover 1 is structurally important in prestressed preloaded constructions. Load transfer between components of the pipe-line structure used as high pressure pipe-lines is best achieved when materials components of the structure are in integral bonded structure. This is particularly important in the structure's capabilities in resisting dynamic loadings. It is also highly desirable in providing impervious wall structure in embodiments of the invention.

When reliance is placed upon mechanical bond between the pipe-liner 377 and the concrete 1 cover, constructions having ridges of various spacing requirements that are cable-like in construction but still a part of the winding of the fibers are found to be adequate. The ease with which additional fibers, e.g., glass fiber unidirectional roving are wound into the pipe-liner 377 construction, provides a lost cost means of structural integrity. In the apparatus of FIGS. 5, 6, 7, and 19 the platen surface can be provided with matched configurations to accommodate the cable-like windings. This embodiment involves little additional work since the pipe-liner 377 in this case has the fibrous reinforcement wound as designed and provided on the reel-unit.

The bonding resin composition 78 as mentioned *supra* as being applied to the pipe-liner 377 at its leaving the oven 241 can and is further combined with Portland Cement in its dry state mixed with sand 79 at the entrance of the pipe-liner 377 to the concrete placing machine. Here the flowable mix concrete is vibrated and moved into place around and about, over and under the said pipe-liner 377. The polymeric resin composition still in its polymerizable state and the dry Portland Cement and sand comingle with the wet or flowable mix concrete at the interface and a very strong bonded structure is obtained, i.e., when the whole of the composite materials set and cure.

The preimpregnated constructions adapted to packaged ready-for-use reel-unit constructions can be made out of unidirectional glass fibers, tapes, or fabric constructions and the resin systems as of now used generally are epoxy or unsaturated polyester resin systems. In the case of epoxy resin compositions, aromatic diamines such as meta-phenylendiamine, diaminodipheny; methane, (both of which provide short shelf lives for the preimpregnated fibrous constructions package) or diaminophysulfone (which provides a longer shelf life) may be used as hardners. Other hardners or curing agents may be anhydrides such as "Nadic" anhydryde or pyromellitic dianhydride but these are hardners requiring relatively long cures and unless modified with other hardner systems slow up the process of pipe-liner manufacture. $BF_3$ monoethylamine complex provides flexible tacky preimpregnated materials and are utilized in this example. In combination with diaminodiphenylsulfone $BF_3$ monoethylamine is a secondary curing agent, i.e., in curing epoxy resin compositions.

Unsaturated polyester resin compositions are useful in making these preimpregnated fibrous constructions and a very substantial feature is derived from these resin systems. The shrinkage of the unsaturated polyester resins provide substantial induced prestressed preload and also provide low cost constructions. Both solvent drying systems and 100 percent solids resins which are heated in the process of impregnation to achieve viscosities are known in the art. Reinforcement is dipped and doctor bladed or other wise impregnated. Mixtures of DAP or other monomer vehicles to which are added pulverized resin solids may be used to make preimpregnated constructions. Fillers may also be added in formulated constructions. Dry pulverized polyester resin compositions, e.g., Atlac 382 unsaturated polyester resin composition plus appropriate curing catalyst and promoters are known in the art and are widely used. Very long pot lives are available in these particular systems.

Other resin systems include phenolic, melamine and urea, silicone and also find use either alone or in combination with unsaturated polyester resins and epoxy resin compositions. The structural engineering design in view of the chemical engineering involved governs specific structural embodiments.

Isophthalic based unsaturated polyesters and unsaturated polyesters made by using hydrogenated bisphenol A with maleic, fumaric, and phthalic acids and propylene glycol provide resin systems having high resistance to chemical attack.

EXAMPLE II

Using the apparatus of FIG. 21 a partially cured ready-for-use pipe-liner 377 is manufactured on the said apparatus on-site wherein said apparatus is a component of a composite concrete pipe making and laying train of this invention. One embodiment of the invention is made as follows:

First a layer of mold release is applied to the cold mandrel, i.e., at ambient temperature, and next a plurality of forward moving strands of fiber, e.g., glass fiber unidirectional roving strands having a chrome size thereon are placed in position for spinning in a helical winding and then are wound at a selected helical angle, e.g., 54.75° from the horizontal which comprises the winding angle. It is known that in any given combination of helical systems of winding, the girth strength will be equal to the sum of the products of $\sin^2\Theta$ and the thickness of the winding at that angle, expressed as a fraction of the total wall thickness, times the hoop tensile strength of unidirectional windings for the material used. The same relationship holds for $\cos^2\Theta$ and the longitudinal strength. The elastic properties of a balanced cylindrical structure are such that strain is equal in all directions. These are the properties sought in this example.

While the strands of glass fiber roving are being spun onto the said mandrel, polymerizable polymeric resin composition as e.g., isophthalic based unsaturated polyester resin composition having a catalyst as e.g., benzoyl peroxide based catalyst and adapted to curing at 250°F. is applied to the strands of fiber as they are layed upon the mandrel under a preselected tension, and this until the mandrel is covered for the desired length of mandrel.

Next with at least some of the forward moving strands of fiber layed onto said mandrel, start placing stands of glass fiber unidirectional roving in cross-lay position at an equal but opposite lay to the forward moving strands, i.e., an angle of 54.75° helical angle and spin and lay in reverse moving lay said glass fiber strands, and cover substantially all of the first layed strands of said glass fiber roving, and while this being done continue applying polymerizable polymeric resin composition, the said unsaturated isophthalic polyester resin composition and said catalyst therefor so as to cover the surface of all strands of fiber in a substantial manner.

At this stage of construction with a substantial amount of resin compostion present to insure against pinholes, a product is now made ready for curing and is considered as the basic construction of a pipe-liner 377. As the design requirements are met additional features can be incorporated. For this product all that remains to be done is to cure it to that stage of cure to make it self supporting and yet have the capability of having the bonding resin composition 78 placed on its exterior surface if this is required in a design.

To cure this embodiment of the invention heat is applied to the inside of the mandrel so that the aluminum cylinder comprising the mandrel is expanded by heat which expansion causes the fibers to nestle and align themselves initially as the curing progresses. This can be done while the spun glass fiber roving is moving across the mandrel in a preselected rate of forward movement, or it can take place while the glass fiber roving is in a fixed position to obtain this state of cure. The initial phase of the cure should take only a few moments, e.g., 2 to 4 minutes for certain known catalyst systems. The pipe-liner 377 can be moved forward on the mandrel in increment after a desired state of cure is reached or the forward movement can be continuous depending upon the apparatus. A cooling phase can be introduced to return the mandrel to ambient temperature between increments. The apparatus can be provided with either means by providing controlling means.

As the partially polymerized polymeric resin composition reaches the desired state of cure, the pipe-liner 377 is moved forward into the trench and is further covered with the bonding resin composition 78 if desired. As the pipe-liner 377 enters into the concrete placing machine it receives a covering of sand, or 79 Portland Cement and sand in a dry state and adheres to the polymeric resin composition already in place. As the concrete 1, or resin-crete concrete or elastromer-crete concrete 1 is placed by vibration and gravity about the pipe-liner 377 in the concrete placing machine, the interface materials 78 and 79 comingle with the wet or flowable mix concrete and thoroughly bind and bond the pipe-liner 377 to the concrete cover.

The composite polymeric resin composition-fiber reinforced concrete pipe construction thus is provided by continuous on-site manufacturing operation. Time is a critical feature and each step must be done in accordance with a plan. For the pipe-liner 377 in this embodiment to reach a stage of cure for its polymeric resin compositions in and of the fibers ahead of schedule could effect the integrated structure desired in the combination of materials at the interface between the pipe-liner 377 and the concrete 1 materials. The ditcher and tractor is the moving force for the whole train of apparatus and as the ditch is dug the apparatus on the pipe-liner carrying vehicle is set in motion and manufactures the pipe-liner 377 and places it into the trench where it is fed into the concrete 1 placing machine and covered and intergrated to the said concrete 1. The composite concrete pipe-line structure is thus made in a continuous structure process.

EXAMPLE III

In this example additional features are provided to the pipe-liner 377 wherein prestressed preloaded cable-form reinforcements are added for horizontal support as in FIG. 20. With the pipe-liner in place in the trench and ready for the concrete cover 1, apparatus comprising elements 907, 909, 910, and 911 are placed in the trench about the pipe-liner 377. Bulkhead 907 comprises a heavy member consisting of two pieces of iron or other useful material that is bolted together around the pipe-liner 377. Bulk-heads 909 and 911 are similar members and have supporting means for hydraulic jack or jacks by which the bulk-head 911 is pushed outward to lengthen the reinforcement cable 71 to the desired amount of prestressed preload. Different means can be used to hold the bulk-heads in position, one being the use of the concrete 1 being applied around the pipe-liner 377 and the tensioning of the cable being done while the concrete 1 is in its uncured state, the dead load of the concrete being sufficient to hold the bulk-head in position.

Another means that can be used to hold the bulk-heads in position is to use a spreader bar or bars (not shown) and remove them after the concrete is set. Still another means is to have the bulk-heads attached to a heavy vehicle and place the vehicle over the trench and drop the bulk-heads down from strong supports and leave the vehicle in place until the concrete sets.

Another means that can be used in this prestressing operation is to use cable-forms 71 having an impervious cover and capability of movement within the cover. In this case the concrete is poured around the pipe-liner and the cable-form 71 and allowed to set. After the concrete 1 has set the prestressing of the prestressed preloads into the cable-form is done and the end-anchorage means utilized for the holding of the stresses induced, this being a post-tensioning means in this application.

In my prior U.S. Pats. Nos. 2,671,158, 2,951,006, and 3,111,569, are shown embodiments of cable-forms useful in this example. Means to set the polymerizable polymeric resin compositions embedding and surrounding the fiber reinforcements of the cable-forms are disclosed therein. These means can be slow setting catalysts or curing agents and means as shown or can be resistance wires connected to a source of energy, e.g., a portable welder outfit, or an electrical distributing line which can provide energy on demand to raise the temperature of the said wires, or an electrical generator powered by a diesel engine, can furnish power.

The heat of solidification of the concrete about the cable-form also aids in curing the polymeric resin composition. Alkalie or acidic components of particular concretes (as broadly defined herein) can be activators or catalysts for polymeric resin compositions brought into contact with them as in the construction of FIG. 20, it being understood that the cable-forms just mentioned comprise fibrous reinforcements embedded in polymerizable polymeric resin compositions, e.g., epoxy resin such as Shell Chemical #828 copolymerized with a polyamide resin such as Versamid 140 sold by General Mills Co., of Kankakee, Illinois.

If the reinforcement is of steel prestressing cable, rod or bar, the mechanical means of the art is employed to prestress preload these reinforcements and the mechanical anchorages of the art or the resort to bonded reinforcements is employed. However, in certain constructions where bonded structure of a high order is required, the combination of e.g., Roebling's steel pressing cable wrapped in unidirectional and multi-directional glass fiber and bonded with a high strength polymeric resin composition provide a bonded structure which under an A.S.T.M. Shear Test procedure showed 1,567 lbs. per lineal inch of cable at a temperature of 250° F. wherein the test sample was heat soaked for 24hours before the test and tested at 250°F. The Pacific Coast Uniform Code allows 24 lbs. per lineal inch shear value for steel bars bonded with Portland Cement mortar, and this at ambient temperature of 70°F.

The combination of features in inducing prestressed preload by mechanical means and chemical means provides high integrity structure because permeation of the concrete by the polymerizable polymeric resin compositions provides in place in the structure of the concrete itself strong "fingers" of set polymeric resin composition that are anchorages of bonded structure. Additionally, the shrinkage of the resin composition, e.g., an unsaturated polyester resin, when captured in the set resin, augments the force systems provided.

EXAMPLE IV

In this example the product and method of example II is provided with additional features. Before the wound or spun glass fiber reinforcements comprised of two helical lays at opposite helical angles of 54.75° from the horizontal is cured, an additional circular lay of glass fiber roving is layed onto the mandrel so that roving by roving a full cover is applied over the helical lays underneath. The circular lay of glass fiber roving is substantially at right angle (90°) from the horizontal and compresses the helical lays and forces out air which sometimes is entrained in the said helical lays. Additionally, its structural engineering function is provided in conformance with a designed structural concept.

This construction can be used and provided in the pipe-liner 377 as found in example I. In either case the circular wrapped lay of glass fiber, or in fact any other designed use of fiber or even wire, can be layed so as to provide other cable-form embodiments merely by concentrating the winding in a pattern and providing a plurality of glass fibers in particular spacing so that a corrugated or ridge-like effect is obtained by the winding.

EXAMPLE V

The forming of a strong impervious concrete structure having features of rapid end use of the product or resistances directed to particular materials or environments, e.g., alkalies, acids, or stress conditions, etc., is here disclosed. The pipe-liner 377 of FIG. 21 made as in example IV is in this embodiment lowered into the trench and has element 78 and 79 placed on it as disclosed *supra*. The concrete applied as cover is made with a polymerizable polymeric resin composition in accordance with the following formula:

| | |
|---|---|
| Unsaturated polyester resin pounds (Use an isophthlalic resin such as Interchemical Corp. Clifton, N.J. "Chem-Stress" 770 | 35 |
| Styrene monomer do | 7 |
| Methylethyl ketone peroxide grams | 160 |
| Cobalt Naphthenate (6%) do | 15 |
| Chopped glass fiber ½" to 2" do | 150 |
| CaCo₃ Calcium Carbonate-Snowflake from Whitaker, Clark & Daniels, New York, New York pounds | 85 |
| Silica Sand and silica small aggregate ranging from a #30 sand to ¼" particular sizes in blended mixture do | 170 |

As is known in the art, temperature of ambient air, humidity, and environmental features affect the workability of polymeric resin compositions. The above formula is only a guide and in each environment test quantities should be made up and the formula varied slightly for workability. Any increase in benzoyl peroxide or of the accelerator cobalt naphthenate (6 percent) will decrease pot life of the mixture. The concrete placing machine must be cleaned promptly after each batch is placed or have a self cleaning surface, e.g., plastic coating.

If the function of the pipe-line requires substantial resistance to radiological material or debris or chemically charged fluids of this nature, the addition of about 5 percent polyethylene resin in powder form and 95 percent lead powder by weight may be mixed into such a batch but concentrating the deposition of the polyethylene and layer in layer form to act as a barrier material. An increase of the amount of isophthalic unsaturated polyester resin composition is required and this will vary but approximates the quantities of resin already in the mix as an addition. Smaller quantities of polyethylene and lead powder should be placed at a time because of the specific gravity of the lead. Additional amounts of fiber or glass fiber serves as supporting media in certain environments.

In certain embodiments of this example, it will be desired to further protect the pipe-liner 377 and the radiological barrier and this can be done on-site by having two concrete placing machines in tandem. The first machine dispenses the polymeric resin composition bound concrete and the second dispenses the Portland Cement bound concrete or other material bound concrete. A length of trench is dug and the second machine lays a layer of Portland Cement concrete on the bottom of the trench. It is then pulled back and the composition of polymeric resin bound concrete is supplied by the first machine and is followed by the second concrete placing machine to cover the pipe-liner and radiological barrier. Other means can be used to time or place these materials and no means is limited because of the nature of the many polymeric resin compositions available. Extrusion of polyethylene or polypropylene resin pipe-liners, or polyvinyl chloride resin pipe-liners 377, or as components of multi-polymeric resin compositions structures or laminated layers thereof, are used in the required different types of structures this invention provides. For example, an extruded polyvinyl chloride resin pipe-liner can be filament wound or otherwise covered with glass fiber reinforcement embedded in a polymerizable polymeric resin composition, e.g., epoxy resin having a polyamide resin as a copolymerizable curing agent wherein the polyvinyl chloride resin tube acts as a mandrel first and then remains in place as part of the composite structure of the pipe-line. A plurality of layers each having features of functionality of design of a particular product requirement can be used wherein some of the layers are thermoplastic resins as e.g., polyethylene or polyvinyl chloride resins, and some of the layers are thermosetting resins as e.g., the epoxy resins having a curing agent or the unsaturated polyester resins, or the polyurethane resins. The fibers useful in certain embodiments of this example include glass fibers, quartz fibers, polythylene fibers, ceramic fibers, etc., as otherwise disclosed herein.

Particular projects will require both thermosetting and thermoplastic polymeric resin compositions such as providing an inner layer such as element 121 being made of butyl rubber, or neoprene rubber, or elastomeric resin based rubber, polyethylene, polypropylene, polycarbonate, or the other thermoplastic resins and rubber resins now available and additionally coming into the market. The structural engineering load bearing structure can include reinforcements made of glass fiber, steel, stainless steel, aluminum, berylium, titantium and exotic metals. Multifunctional reinforcements can thus be provided.

Where functions of designed structures of the invention require it, the use of fibers selected from the group consisting of glass, jute, cotton, ramie, bamboo etc., can be used alone or in combination with glass fibers, but not limited thereto.

Pipe liner 377 as shown in FIGS. 5, 6, and 7 can have additional means of reinforcement provided by constructions shown in FIGS. 15 and 16. In the processed pipe-liner 377 package in ready-for-use state, the addition of cable-forms 71 having end-enlargements anchorages as shown can be packaged in the package. Orientation of cable-forms 71 is accomplished by the construction of FIG. 17 and FIG. 18. In FIG. 21 apparatus the cable-form 71 can be made right on the pipe-liner 377 by the apparatus or it can be added thereto after the initial construction of the pipe-liner of the invention is in the trench.

EXAMPLE VI

Field conditions of terrain or rough country or other reasons will require modifications of the instant invention by making it practical to manufacture the pipe-liner 377 in ready-for-use states in lengths from say 4 feet long to say 40 feet long but not limited thereto. These lengths can be made in bell and spigot type as shown in FIG. 25. If made off site they can be joined together by adhesive bonding on a trailer rig placed in-between the ditcher and the concrete placing machine. The process is similar in all respects except that the pipe-liner 377 is fabricated into long lengths ahead of the concrete placing machine. In all examples cited the pipe-liners 377 have been self-supporting in the trench but the procedure of example VII can be followed for the above examples I—VI if the pipe-liners required are not self supporting to carry the loads of the concrete cover.

EXAMPLE VII

This example is directed to installations wherein the pipe-liner 377 is of thin cross section and is not able to support the load of the flowable concrete mix as it is loaded and placed onto the pipe-liner 377.

As shown in FIGS. 1,2,3,4,5,7,19, and 21 extensive apparatus is provided to inflate the pipe-liner 377 with e.g., 3 to 10 lbs. of fluid or air pressure which amount of pressure generally is sufficient to support the dead load of the concrete 1 as placed over, under and around the said pipe-liner 377. In FIG. 21 compressor 50 and air tanks 51 provide air pressure for multipurpose uses in the processing of the said pipe-liner 377. Reinforcement 777 is aided in being removed in forward motion from the mandrel 2367 by air pressure released from orfice 55 of said mandrel 2367. The air cushion provides aid for forward movement of the pipe-liner 377 in its being moved by the friction type, or other known types of belts 31 and 33. Additionally the air is held in the inside of the pipe-liner 377 to hold the pressure until the concrete is set. The apparatus of FIG. 7 illustrates means for closure in the forward end of the construction and FIG. 21 shows means provided as end closure to pipe-liner mandrel 2367.

The air supply tube 223 shown in FIG. 7 and in FIG. 19 unreels as the trailer moves forward. Alternatively, when a mandrel like that of FIG. 14 is used no tube 223 is needed because the mandrel is also an air tank and holds enough air supply to provide for a given preselected length of construction of the composite pipe of this invention.

Alternatively, lengths of pipe-liner 377 as shown in FIG. 3 can be joined together and inflated in lengths pre-selected for portions of, or full length pipe-line structures.

The polymerizable polymeric resin compositions useful in this invention are many and the following formulations are examples of but by no means are these formulations examples considered as limiting the formulations used:

|  |  | Parts by weight |
|---|---|---|
| No. 1 | Epoxy resin, Shell Chemical Co. No. 826 | 100 |
|  | Polyamide resin, General Mills Co., Versamid 140 | 50 |
|  | DMP 30, Thiokol Corp | 5 |
| No. 2 | Epoxy-acrylic resin-(Epocryl E-11) Shell Chem. Co | 100 |
|  | Styrene-monomer | 10 |
|  | Dimethylaniline | 0.05 |
|  | (Depending upon the cure cycle this material can be at concentrations from 0.01 to 0.5% by weight of the resin.) |  |
|  | Benzoyl peroxide | 1.0 |
|  | Cab-O-Sil, finely divided silica | 1.0 |
|  | (Depending upon temperature of ambient air and humidity this can be more or less until right working viscosity is obtained.) |  |
| No. 3 | Glass fiber roving–20 end, or 30 end or 60 end, treated with any of t'ese treatments Volan, Garan, A-17a and Z6030 which are Methacrylato, Triethoxysilpropylamine, Vinyl triethoxysilane, Vinyl tris-2-methoxysilane, and y-meth-acryloxpropytrimethoxysilana (4) |  |
| No. 4 | Isophthalic unsaturated polyester resin | 100 |
|  | Methylethyl ketone peroxide DDM | 1 |
|  | Cobalt napthenate (6%) | 0.2 |
|  | Styrene monomer | 5.0 |
| No. 5 | Buf-Tuf XB-303, Petrox-Tex Chemical Corp., polymerized butylenes as made at Houston, Texas | 100 |
|  | (Used only in uses where no hydrocarbons or chlorinated solvents are found. Used as heat melts and as components of pipe-liner systems. Joints made with said solvents.) |  |
| No. 6 | High molecular weight rigid PVC, polyvinyl chloride resin systems as defined in ASTM-D-1784060T pipe materials for use as components of pipe-liner systems. |  |

My prior patents show other useful polymeric resin compositions which are used alone or in compatible combinations of structure as herein disclosed.

The polymerizable polymeric resin compositions 78 plays an important part in obtaining the bonded structure desired in some of the embodiments of this invention. Placement of polymerizable polymeric resin composition 78, e.g., Shell Chemical Co. No. 828 having a copolymerizable curing agent comprising General Mills Company, Versamid 140 as a basic mix which can be modified with a known diluent or modifier is obtained by the addition of thickening materials such as Cabot's Cab-O-Sil, a finely divided silica or other thixotropic forming materials. It is known how to place resinous materials on vertical or near vertical surfaces without having run-off. Adhesive materials are many and are what their name implies —adhesive. Dry sand or dry sand and Portland Cement powders or in fact any other bonding mediums adhere to these adhesives and in combination with the pressure exerted by the concrete 1 at the interface between the concrete 1 and the pipe-liner 377 provides "fingers" extending into the set concrete 1 when the whole structure is cured and set.

In one particular embodiment the air used for supporting the pipe-liner 377 in addition to its own supporting strengths was increased after concrete 1 had been placed but was not very far along in curing. From a pressure of about 3 lbs. the air pressure was raised to 20 lbs. This induced a prestressed preload into the pipe-liner reinforcement and the concrete 1 which load was captured in place when the composite materials of the structure of the pipe-line had fully cured. Additionally, the fingers of resin were driven farther up into the matrix of the concrete 1 and when set provided very secure anchorages at the interface between the pipe-liner 377 and the concrete 1. When the whole composite structure was cured, the said pressure was released and a prestressed preloaded structure pipe-line resulted. It must be kept in mind that because layers of material being used it is possible to have the inner most layer fully cured while exterior layers are not fully cured and these exterior layers after the inner layer can be bonded to additional layers such as the interface between the pipe-liner 377 and the concrete 1 itself.

EXAMPLE VIII

In certain embodiments pipe-liner 377 can be placed into an existing pipe-line that has deteriorated in use as from cracking of the line or salt water corrosion or other failures. In this case the existing line is good enough to serve as an outer casing and the pipe-liner 377 is forced or layed into the said pipe-line. A concrete grout or mortar or a resin-crete mortar can be injected in between the pipe-liner 377 and the existing pipe-line, or it can be secured but not grouted. Cast iron pipe-lines or steel lines can similarly be improved or replaced. The high surface smoothness of the pipe-liner 377 offsets the flow loss due to smaller size of the pipe-liner 377 than the original pipe-line material so that substantially the same volume of flow through the pipe-line can result. Bell and spigot type pipe-liner 377 as shown *supra* would be useful.

In the description of the invention *supra* the term earth's environment has been used and it is contemplated that any earth's environment wherein a moving set of apparatus can be used is considered as part of the invention herein. In the place of working overland using wheeled conveyances for the apparatus it is considered equivalent to use transporting apparatus such as boats, scows, or any water borne craft that can be moved or is capable of moving itself.

The broad definition of the use of the word "concrete" is stressed as any binder capable of binding together materials as used herein including Portland Cement and/or polymerizable polymeric resin composition, etc., bound concrete as meeting the broad definition of the word "concrete".

The terms and description and the expressions used herein which I have employed are used as teaching description and not of limitation, I have not intended nor have the intention in the use of such terms and expressions, of excluding any equivalents of the features shown and described or portions thereof, but recognize that various modifications are possible within the scope of the invention claimed.

I claim:

1. A composite reinforced structural material pipe-line for laying onsite in a suitable earth's environment comprising a cast-in-place polymeric resin composition fibrous reinforced pipe-liner and a structural material, said materials having been formed on a mandrel comprising:

1. a first layer comprising a pipe-liner comprising a continuous layer of fibrous reinforcing material integrated and embedded in a partially polymerized polymeric resin composition;

2. a second layer comprising a selected thickness layer of structural material comprising at least one aggregate particle filler integrated and embedded on the and to the surface of said at least partially polymerized polymeric resin composition;

3. a third layer comprising a selected thickness layer of said fibrous reinforcing material integrated and embedded in the partially polymerized polymeric resin composition on the and to the surface of said structural material comprising at least one aggregate particle filler integrated and embedded in additional said polymerized polymeric resin composition;

4. a selected number of additional layers of said structural material comprising at least one aggregate particle filler integrated and embedded on the and to the surface of said fibrous reinforcing material and alternate layers of said fibrous reinforcing material integrated and embedded in the partially polymerized polymeric resin composition on the and to the said structural material layers comprising at least one aggregate particle filler;

5. said layers having said polymeric resin composition at least partially polymerized and set so that said composite reinforced structural material pipe wall body relative to said mandrel extends from said mandrel into said on site suitable earth's environment and comprises said pipe-line.

2. A composite reinforced structural material pipe-line for laying on-site in a suitable earth's environment as in claim 1, in which an additional layer of structural material is cast-in-place around, over and under said pipe-wall body pipe-line in said on-site suitable earth's environment.

3. A composite reinforced structural material pipe-line as in claim 1, for laying onsite in a suitable earth's environment in which said structural material layer comprises at least one aggregate particle filler, and said filler comprises sand in the dry state covered and embedded in said partially polymerized polymeric resin composition.

4. A composite reinforced structural material pipe-line for laying onsite in a suitable earth's environment as in claim 1 in which said fibrous reinforcing material comprises continuous glass fiber strands wound at a selected angle of wind.

5. A composite reinforced structural material pipe-line for laying onsite in a suitable earth environment as in claim 1, in which pipe-wall-thickness-guides are disposed at selected spaced distances by means on said pipe-liner as means to provide substantially even pipe-wall thicknesses of said structural material.

6. A composite reinforced structural material pipe-line for laying onsite in a suitable earth environment as in claim 5, in which said pipe-wall-thickness-guides have at least one reinforcing cable-holder adapted to space at least one reinforcing cable in a structurally desired placement on said pipe-liner.

7. A composite reinforced structural material pipe-line for laying onsite in a suitable earth environment as in claim 6, in which said pipe-wall-thickness-guides are fabricated from materials selected from the group of materials comprising metal, polyethylene, thermoplastic resin materials, thermosetting resin materials, wood materials, said pipe-wall-thickness-guides comprising one piece constructions and selected belt-form constructions.

8. A composite reinforced structural material pipe-line for laying on-site in a suitable earth environment as in claim 1, in which said pipe-wall-thickness-guides comprise materials having the capability of substantial expansion and contraction to accommodate movement in said pipe-line.

9. A composite reinforced structural material pipe-line for laying onsite in a suitable earth's environment as in claim 1, in which said pipe-line construction is vertically disposed and provides pile constructions.

10. A composite reinforced structural material pipe-line as in claim 1, wherein said structural material is selected from the group consisting of Portland cement bonded concrete, polymeric resin composition bonded concrete, elastomer resin composition bonded concrete, and rubber resin composition bonded concrete.

11. A composite reinforced structural material pipe-line as in claim 1, in which said fiber reinforcement comprises glass fibers reinforcement selected from the group consisting of glass fiber rovings, glass fiber rovings unidirectional fiber mats, glass fiber woven rovings mats, glass fiber random fiber mats, glass fiber cloths, glass fiber surfacing mats, chopped glass fiber strands, glass fiber strands, in any compatible combination.

12. A composite reinforced structural material pipe-line as in claim 1, wherein said fiber reinforcements are selected from the group consisting of natural fibers, sisal fibers, hemp, rope, wood fibers, bamboo fibers, burlap, wood pieces, each used alone or in compatible combinations.

13. A composite reinforced structural material pipe-line as in claim 1, wherein said polymeric resin composition contains a filler therefor.

14. A composite reinforced structural material pipe-line as in claim 1, in which said pipe line comprises selected lengths of said pipe-liner having bell and spigot ends to said pipe line and sealing elements in said joints providing means of expansion and contraction capabilities to said pipe-line.

15. A composite reinforced structural material pipe-line as in claim 1, in which said pipe-liner comprises selected lengths of preformed pipe liner having joinery means and provides processing means wherein said pipe-liner was formed and which said pipe-liner remained in place as a component of structure of said composite reinforced structural material pipe-line.

16. A composite reinforced structural material pipe-line as in claim 1, in which the exterior surface of said pipe liner has an uneven surface providing mechanical bond of said structural material pipe wall body to said pipe-liner.

17. A composite reinforced structural material pipe-line as in claim 1, in which said pipe-liner has a portion thereof of its pipe wall body at its exterior surface, cable-like embodiments of filament wound fiber reinforcements embedded in polymeric resin composition comprising ridge-like reinforcing and bonding elements of structure for said structural material pipe wall body bonded to said pipe liner.

18. A composite reinforced structural material pipe-line as in claim 1, in which said pipe-liner has an inner layer comprising a material selected from the group of polymeric resin compositions consisting of thermosetting polymeric resin compositions, thermoplastic resin compositions, and compatible combinations of thermosetting and thermoplastic resin compositions.

19. A composite reinforced structural material pipe-line as in claim 1, in which said pipe liner has a first inner layer element having release agent properties during processing at time of manufacture which in use as a component of said pipe-liner, provides features of corrosion resistance and chemically engineered construction features as components of said pipe lines, said first inner layer element comprises a material selected from the group consisting of a layer of (Mylar) polyethylene terephthalate, neoprene rubber, vinyl resin, butyl rubber, rubber resin, chlorinated polyethylene, polycarbonate resin, proprietory thermoplastic resins, polyethylene, polyvinyl chloride, nylon, polypropolene, Teflon, silicone, unsaturated polyester resin, epoxy resins, metal powders, minerals, and compatible combinations thereof.

20. A composite reinforced structural material pipe-line as in claim 1, in which said pipe-liner has glass fiber reinforcements helically wound at selected angles of winding.

21. A composite reinforced porous structural material pipe-line as in claim 1, in which said porous structural material comprises a concrete mixture selected from the group of materials consisting of Portland cement concrete, lightweight Portland cement concrete, perlite concrete, fire-expanded shale aggregate concrete, fire-expanded clay aggregate concrete, volcanic cinder aggregate concrete, processed cinder aggregate concrete, river run crushed rock aggregate concrete, pit-excavated aggregate material concrete, silica sand aggregate concrete, washed aggregate sand concrete, Portland cement concrete having noncementitious cement additives, polymeric thermosetting resin composition bonded concrete, polymeric thermoplastic resin composition bonded concrete, compatible combinations of thermosetting and thermoplastic resin composition bonded concrete, and rubber resin composition bonded concrete.

22. A composite reinforced structural material pipe-line as in claim 1, in which said structural material comprises a concrete mixture bonded by a resin composition selected from the group of polymeric resin compositions consisting of unsaturated polyester resin compositions, epoxy resin composition having a curing agent therefor, epoxy-polyamide resin composition, epoxy-polysulfide resin composition, epoxy-proprietory amine setting agent resin composition, epoxy-polyamine resin composition, polyvinyl chloride resin composition, polyurethane resin compositions, urethane resin compositions, phenolic resin compositions, phenolic-melamine resin compositions, isophthalic unsaturated polyester resin composition, unsaturated polyester resin compositions made by using hydrogenated bisphenol A with maleic, furmaric, and phthalic acids and propylene glycol, silicone resins, combinations of compatible unsaturated polyester resins and epoxy resin compositions, polyethylene and lead polymeric resin bonding resin compositions, polypropolene resins, epoxy-acrylic resin compositions having styrene monomer and dimethylaniline, polymerized butylenes, and any compatible combinations of said polymeric resin compositions.

23. A composite reinforced structural material pipe-line as in claim 1, in which said pipe-line has a radiological barrier as a component of its structure exampled by a polyethylene resin composition having a lead powder filler.

24. A composite reinforced structural material pipe-line as in claim 1, in which fiber reinforcements are selected from the group consisting of glass fibers, quartz fibers, and ceramic fibers.

25. A composite reinforced structural material pipe-line as in claim 1, in which said reinforcements comprise reinforcements selected from the group of metals comprising steel, stainless steel, aluminum, beryllium, titanium, and exotic metals.

26. A composite reinforced structural material pipe-line as in claim 1, in which said pipe-liner comprises an unsaturated isophthalic polyester resin composition having a benzoyl peroxide catalyst, a plurality of glass fiber unidirectional roving strands filament wound in a cross-lay position at a selected helical angle, an interface layer of bonding material; and a selected concrete pipe wall body over said pipe liner and interface layer of bonding material.

27. A composite reinforced structural material pipe line as in claim 25, in which in addition said pipe liner has an inner layer of corrosion resistant and impermeable material and a circumferential layer of said glass fiber unidirectional roving strands embedded in said unsaturated isophthalic polyester resin composition placed over said helically wound roving strands.

28. A composite reinforced structural material pipe-line as in claim 1, in which said pipe-liner comprises an inner layer of gel coat of unsaturated polyester bisphenol-A-fumerate resin composition having a benzoyl peroxide catalyst, a finely divided silica and mineral filler in said resin composition, a plurality of glass fiber reinforcements embedded in said resin composition over said inner layer, an interface bonding layer comprising a selected polymeric resin composition having a mineral filler therefor, said polymeric layer composition exampled by an epoxy resin having a curing agent therefor.

29. A composite reinforced structural material pipe line as in claim 1, in which said pipe line structure comprises an inner layer of corrosion resistant material exampled by a fiber reinforced polymeric resin composition, an epoxy resin composition having a curing agent therefor, a plurality of glass fiber reinforcements selected from the group consisting of fiber glass rovings, unidirectional glass fiber strands, woven glass fiber strands, glass fiber cloth, polyethylene terephthalate strands, glass fiber tapes, multidirectional glass fiber strands, glass fiber mats, unidirectional glass fiber mats, each used alone or in compatible combination comprising a second layer, an interface bonding resin composition having a mineral filler therefor exampled by sand over said second layer, and a porous structural material pipe wall body made of a concrete selected from the group consisting of Portland cement concrete, polymeric resin composition bonded concrete, elastomeric resin composition bonded concrete and rubber resin composition concrete.

30. A composite reinforced porous structural material pipe-line as in claim 29, in which said interface bonding resin composition is water compatible in its setting state and comprises a polymeric resin composition exampled by but not limited to an epoxy resin composition having a polyamide resin composition curing agent.

31. A composite reinforced structural material pipe-line as in claim 1, in which said structural material is a concrete material selected from the group of materials consisting of sand, silica sand, ground minerals, heat resistant mineral material, pumice, tufa, volcanic ash, aluminum silicate, Carborundum, lead minerals, lead powders, lead granules, metal granules, glass beads, quartz particles, silicon-carbide particles, asbestos, antimony oxide, calcium carbonate, calcium sulfate, magnesium carbonate, microspheres, made of high silica glass, pure silica, phenolic foam materials, urea-melamine foam material, syntatic foam material, rocks, man-made fire expanded shale aggregates, man-made fire expanded clay aggregates, inorganic hollow beads, aluminum powder, with bonding agents being selected from the group consisting of sodium and potassium silicates, silica sols, oxysulfate cement, aluminate cements, calcium aluminate cements, and phosphate cements, Portland cement, natural cements, polymeric resin compositions, elastomeric resin compositions, and rubber resin compositions, each used alone or in compatible combinations.

32. A composite reinforced structural material pipe line as in claim 1, in which said structural material is a concrete material selected from the group of low-density inorganic materials consisting of silica, lightweight ceramic aggregates, amorphous minerals, tripolite, infusorial earth, perlite, oolitic limestone, pisolitic bauxite, heat expanded mica, vermiculite, and graphite, used in compatible combinations.

33. A composite reinforced pipe-line as in claim 1 in which said pipe-liner comprises an onsite made polymeric-resin-composition-fiber-glass-filament-wound-pipe-liner.

34. A composite reinforced pipe-line as in claim 1, in which said pipe-liner comprises selected lengths of preformed pipe-liner having joinery means, said joinery means providing means of expansion and contraction to said composite reinforced pipe-line.

35. A composite reinforced pipe-line as in claim 1, in which the exterior surface of said pipe-liner has an uneven surface providing a mechanical bond of said pipe wall body to said pipe-liner.

36. A composite reinforced pipe-line as in claim 1, in which said pipe-liner has on its exterior surface, cable-like embodiments of fiber reinforcements embedded in said polymeric resin composition comprising ridge-like reinforcing and bonding elements of structure bonded to said pipe wall.

37. A composite reinforced pipe-line as in claim 1, in which said pipe liner has an inner layer comprising a material selected from the group of polymeric resin compositions consisting of thermosetting polymeric resin compositions, thermoplastic resin compositions, and compatible combinations of thermosetting and thermoplastic resin compositions.

38. A composite fibrous reinforced pipe-line as in claim 1, in which said pipe liner comprises a gel coat inner layer of unsaturated polyester resin composition having a catalyst, a mineral filler in said resin composition, a plurality of glass fiber reinforcements embedded in said resin composition over said inner layer, and an interface bonding layer comprising a selected polymeric resin composition.

39. A composite reinforced structural material cast-in-place pipe-line for laying in a trench and in combination with the materials of said trench wall comprising the combination of a polymeric resin composition fiber reinforced pipe-liner which first acted as a forming means about which a structural material pipe wall body was cast-in-place about said pipe-liner, said pipe-liner having been formed on a mandrel comprising:
1. a first layer comprising a pipe-liner comprising a continuous layer of fibrous reinforcing material integrated and embedded in a polymerized polymeric resin composition;
2. a second layer comprising a selected thickness layer of structural material comprising at least one aggregate particle filler integrated and embedded on the and to the surface of said polymerized polymeric resin composition;
3. a third layer comprising a selected thickness layer of said fibrous reinforcing material integrated and embedded in the polymerized polymeric resin composition on the and to the surface of said structural material comprising at least one aggregate particle filler integrated and embedded in said polymerized polymeric resin composition;
4. a selected number of additional layers of said structural material comprising at least one aggregate particle filler integrated and embedded on the and to the surface of said fibrous reinforcing material and additional layers of said fibrous reinforcing material integrated and embedded in the polymerized polymeric resin composition on the and to the said structural material layers comprising at least one aggregate particle filler;
5. said layers having said polymeric resin composition at least partially polymerized and set so that said composite reinforced structural material pipe wall body relative to said mandrel extends from said mandrel into said trench and comprises said pipe-line, said pipe-line having a bonding resin composition on the exterior surface thereof wherein said combination of materials and said trench wall material comprises said structural material pipe-line.

40. A prestressed composite reinforced structural material cast-in-place pipe-line for laying on-site in a suitable earth's environment comprising a polymeric resin composition pipe-liner and a structural material, said materials having been formed on a mandrel comprising:
1. a first layer comprising a pipe-liner comprising a continuous layer of fibrous reinforcing material having an internal stress embedded in a polymerized polymeric resin composition, said polymerized polymeric resin composition having a selected internal stress in its set state;
2. a second layer comprising a selected thickness layer of structural material comprising at least one aggregate particle filler integrated and embedded in the said polymerized polymeric resin composition;
3. a plurality of layers comprising a selected number of additional layers of said structural material comprising at least one aggregate particle filler integrated and embedded on the and to the surface of said fibrous reinforcing material and additional layers of said fibrous reinforcing material integrated and embedded in polymerized polymeric resin composition with the and to the said surface of said structural material layers comprising at least one aggregate particle filler;
4. a selected number of additional layers of said structural material comprising at least one aggregate particle filler integrated and embedded on the and to the surface of said fibrous reinforcing material, said additional layers of said fibrous reinforcing material integrated and embedded in the polymerized polymeric resin composition on the and to the said structural material layers comprising at least one aggregate particle filler;
5. said layers having said polymeric resin composition at least partially polymerized and set so that said composite reinforced structural material pipe wall body relative to said mandrel extends from said mandrel into said onsite suitable environment and comprises said pipe-line.

41. A composite reinforced structural material cast-in-place pipe-line comprising an onsite at-least-partially-processed-reel-supplied-polymeric-resin-composition-fiber-reinforced pipe-liner and a structural-material-pipe-wall-body wherein said pipe-liner was further processed on a mandrel and formed into said pipe-liner comprising:
1. a first layer comprising a pipe-liner comprising a continuous layer of fibrous reinforcing material integrated and embedded in a polymerized polymeric resin composition;
2. a second layer comprising a selected thickness layer of structural material comprising at least one aggregate particle filler integrated and embedded on the and to the surface of said polymerized polymeric resin composition;
3. a third layer comprising a selected thickness layer of said fibrous reinforcing material integrated and embedded in the polymerized polymeric resin composition on the and to the surface of said structural material comprising at least one aggregate particle filler integrated and embedded in said polymerized polymeric resin composition;
4. a selected number of additional layers of said structural material comprising at least one aggregate particle filler integrated and embedded on the and to the surface of said fibrous reinforcing material, said additional layers of said fibrous reinforcing material integrated and embedded in the said polymerized polymeric resin composition on the and to the said structural material layers comprising at least one aggregate particle filler;
5. said layers having said polymeric resin composition at least partially polymerized and set so that said composite reinforced structural material pipe wall body relative to said mandrel extends from said mandrel into said onsite suitable earth's environment and comprises said pipe-line.

42. A composite reinforced structural material pipe-line as in claim 41, in which said on-site-reel-supplied-polymeric-resin-composition-fiber-reinforced-pipe-liner comprises an initial first layer of said on-site-at-least-partially-processed-reel-supplied-polymeric-resin-composition-fiber-reinforced-pipe-liner comprises a thermoplastic resin material impermeable layer selected from the group consists of polyethylene terephthalate (Mylar) film, polyetheylene resin composition material, polyvinyl chloride resin composition material, neoprene rubber resin material, butyl rubber resin material, chlorinated polyethylene resin material, polycarbonate resin composition material, proprietory thermoplastic resin material, and rubber resin composition material; first layer of said on-site-at-least-partially-processed-reel-supplied-polymeric-resin-composition-fiber-reinforced-pipe-liner comprises a thermosetting polymeric resin composition layer having said fiber reinforcements covered and embedded therein; and a third layer of said at-least-partially-processed-reel-supplied-polymeric-resin-composition-fiber-reinforced-pipe-liner comprising an interface bonding layer having a bonding resin composition on said covered and embedded fiber reinforcements.

43. A composite reinforced structural material pipe-line as in claim 42, in which in addition a layer of selected filler material exampled by sand covered by and embedded in polymeric resin composition is disposed between said first and second layers and between said second and third layers and over said third layer bonding layer.

44. A prestressed composite reinforced structural material pipe-line as in claim 40, in which said pipe-line structure has prestressing reinforcement selected from the group consisting of prestressing steel reinforcement, fibrous reinforcement, glass fiber reinforcement, and compatible combinations of any of said reinforcement as components of structure of said prestressed composite reinforced porous structural material pipe line.